US012800920B2

(12) United States Patent
Chen

(10) Patent No.: US 12,800,920 B2
(45) Date of Patent: Nov. 17, 2026

(54) MULTI-VIEWING ANGLE FLOATING PROJECTION DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 908 days.

(21) Appl. No.: 18/055,937

(22) Filed: Nov. 16, 2022

(65) Prior Publication Data

US 2023/0418056 A1 Dec. 28, 2023

(30) Foreign Application Priority Data

Jun. 22, 2022 (TW) ................................ 111123217

(51) Int. Cl.
*G02B 27/01* (2006.01)
*B60K 35/22* (2024.01)
(Continued)

(52) U.S. Cl.
CPC .......... *G02B 27/0101* (2013.01); *B60K 35/22* (2024.01); *B60K 35/425* (2024.01);
(Continued)

(58) Field of Classification Search
CPC .. G02B 27/0101; G02B 5/10; G02B 27/0149; G02B 2027/0118; G02B 2027/014; G02B 2027/0154; B60K 35/22; B60K 35/425; B60K 35/415; B60K 2360/334; B60K 2360/23; B60K 35/211; B60R 2300/205; G03B 21/562; G03B 21/2006; G03B 21/28; G03B 21/53; G03B 21/60
See application file for complete search history.

(56) References Cited

U.S. PATENT DOCUMENTS

2016/0313631 A1* 10/2016 Sugawara .............. G03B 21/28
2018/0157036 A1* 6/2018 Choi .................. G02B 27/0101
(Continued)

FOREIGN PATENT DOCUMENTS

WO WO-2017183556 A1 * 10/2017 ......... G02B 27/0101
WO WO-2018168708 A1 * 9/2018 ............... H04N 5/74

*Primary Examiner* — Bumsuk Won
*Assistant Examiner* — Ray Alexander Dean
(74) *Attorney, Agent, or Firm* — MUNCY, GEISSLER, OLDS & LOWE, P.C.

(57) ABSTRACT

A multi-viewing angle floating projection device including multiple directional light sources, a display panel and an imaging concave mirror is disclosed. The multiple directional light sources emit multiple directional light beams for illuminating the display panel to form multiple directional image beams. The multiple directional image beams are reflected by a reflector to the concave mirror. Then, the multiple directional image beams are respectively reflected by the concave mirror to multiple viewing areas with different viewing angles to form multiple floating projected real images. The illuminated regions of the multiple directional light beams on the display panel are almost the same, or the illuminated regions of the multiple directional image beams on the imaging concave mirror are almost the same, providing a larger viewing angle difference between the multiple viewing areas.

20 Claims, 15 Drawing Sheets

(51) Int. Cl.
*B60K 35/40* (2024.01)
*G02B 5/10* (2006.01)

(52) U.S. Cl.
CPC ........... *G02B 5/10* (2013.01); *G02B 27/0149* (2013.01); *B60K 35/415* (2024.01); *B60K 2360/334* (2024.01); *B60R 2300/205* (2013.01); *G02B 2027/0118* (2013.01); *G02B 2027/014* (2013.01); *G02B 2027/0154* (2013.01)

(56) References Cited

U.S. PATENT DOCUMENTS

2019/0317322 A1* 10/2019 Hayakawa ........... B60K 35/215
2021/0033863 A1* 2/2021 Hong ..................... B60K 35/81
2022/0113539 A1* 4/2022 Koyama ................ B60K 35/22

* cited by examiner

MULTI-VIEWING ANGLE FLOATING PROJECTION DEVICE

BACKGROUND

Technical Field

The present disclosure is directed to a multi-viewing angle floating projection device utilizing multiple directional light sources with different angles to generate multiple directional image beams, and sharing an imaging concave mirror, or a display panel. The multiple directional image beams are reflected by the imaging concave mirror to form multi-viewing angle floating projection real images, thereby lowering cost, reducing space, improving image brightness and reducing energy consumption and heat generation.

Related Art

A vehicle head-up display includes a projector and a screen. The signal source of the projector could be a liquid crystal display (LCD), and the screen could be a semi-transparent screen or a windshield. The optical elements inside the projector project the light of the signal source to the screen, and the text or image of the signal source is reflected by the screen and displayed.

A concave mirror is usually provided on the optical path where the light of the signal source is projected to the screen. The light of the signal source is amplified by reflection of the concave mirror and then projected to the screen.

The focal length of the concave mirror is F, the distance between the object and the concave mirror is the object distance u, and the distance between the image and the concave mirror is the image distance v. The imaging principle of the concave mirror is as follows.

As shown in FIG. 1A, when the object distance is greater than 2 times of the focal length, that is, $u>2F$, the image is an inverted and reduced real image and is located between the 2F point and the focal point in front of the concave mirror, that is, $F<v<2F$. The larger the object distance, the smaller the real image.

As shown in FIG. 1B, when the object distance is equal to 2 times of the focal length, that is, $u=2F$, the image is an inverted real image of the same size and is located at the 2F point in front of the concave mirror, that is $v=2F$.

As shown in FIG. 1C, when the object distance is between the focal point and the 2F point, that is, $F<u<2F$, the image is an inverted and magnified real image and is located out of the 2F point in front of the concave mirror, that is, $v>2F$. The larger the object distance, the larger the real image.

When the object distance is equal to the focal length, that is $u=F$, the light rays projected from the object to the concave mirror would be reflected as parallel light rays, and the image is formed at infinity, that is, $v\approx\infty$.

As shown in FIG. 1D, when the object distance is smaller than the focal length, that is $u<F$, the image is an erected and magnified virtual image behind the concave mirror. The shorter the object distance, the larger the virtual image.

As shown in FIG. 2, an imaging concave mirror 3 is used as a concave mirror for projecting real images. When the distance between the display panel 2 for displaying an erected image and the imaging concave mirror 3 is larger than the focal length of the imaging concave mirror 3, the image light rays projected from any point of the display panel 2 would be reflected by the imaging concave mirror 3 and are converged at the imaging point. If the image is formed in front of the observer, he would see an inverted real image DR. As shown in FIG. 3, when the display panel 2 displays an inverted image, then an erected image could be projected by the imaging concave mirror 3.

As shown in FIG. 4, the image light projected from the display panel 2 is transmitted through the imaging concave mirror 3 and the windshield 4 sequentially, and then projected to the viewer. The optical elements of the projector could be hidden under the instrument panel, so that the observer only see the floating real image DR in cabin.

Generally, a distance between the two observers P1, P2 on a driver's seat and a front passenger's seat is about 60 to 100 cm, and a horizontal view distance from the observers' eyes to the windshield is about 50 to 90 cm. In other words, the projected real image is located inside of the windshield and is closer to the observers than the windshield.

As shown in FIG. 5, to allow both of the driver P1 and the front passenger P2 to view the real image projected in midair at the same time, the projected image needs to have a wide viewing angle of 60 to 100 degrees.

As shown in FIG. 6A, the conventional real image projection utilizes a non-directional backlight source, and the display panel 2 needs to be equipped with a imaging concave mirror 3 having a large area, so that the real image DR could be projected to the observer P1 on the driver's seat and the observer P2 on the front passenger's seat at the same time.

As shown in FIG. 6B, according to the configuration mentioned above, the backlight source 1 illuminates the display panel 2 and the amount of light is evenly distributed to a wide viewing angle, which may lead to insufficient brightness. If a high-power backlight source is used, there are disadvantages of energy consumption and high heat. Using a large-area imaging concave mirror is not only expensive, but also increases the need for installation space.

SUMMARY

The present disclosure provides a multi-viewing angle floating projection device including two directional light sources, two display panels and one imaging concave mirror. The two directional light sources are corresponding to the two display panels, wherein each of the directional light sources is adapted to emit a directional light beam; each of the directional light beams illuminates a corresponding image of the display panels to form a directional image beam; the two directional image beams are reflected by the same imaging concave mirror and projected to two viewing areas to form two floating projected real images respectively; corresponding reflected regions of the two directional image beams on the imaging concave mirror are completely or highly overlapped, providing a larger viewing angle difference between the two viewing angles of the two viewing areas.

In addition, the multi-viewing angle floating projection device further includes two adjusting reflectors, each of which is disposed on an optical path between the two display panels and the imaging concave mirrors. The two directional image beams are first reflected by the two adjusting reflectors respectively and then are projected to the same imaging concave mirror. Each of the adjusting reflectors is a concave mirror or a convex mirror.

Optionally, the multi-viewing angle floating projection device includes more than two directional light sources. The number of the display panels and the adjusting reflectors are corresponding to the number of the directional light sources, wherein each of the directional light beams illuminates an image of a corresponding display panel to form a directional image beam, which is then reflected by a corresponding adjusting reflector and projected to the imaging concave mirror.

The present disclosure further provides a multi-viewing angle floating projection device including two directional light sources, one display panel, two reflectors and one imaging concave mirror. The display panel is adapted to display images time-divisionally corresponding to the two directional light sources; the two directional light sources are synchronized with the time-divisionally display of the two images on the display panels. Each of the directional light source is adapted to project a directional light beam. Each of the directional light beams illuminates a corresponding image of the display panel to form a directional image beam. The two reflectors are disposed on the optical path between the display panel and the imaging concave mirror and are plane mirrors. The two directional light sources are corresponding to the two reflectors such that the two directional image beams are reflected by the two reflectors to converge onto the same imaging concave mirror. The two directional image beams are then reflected by the imaging concave mirror and projected to two viewing areas to form two floating projected real images respectively, wherein corresponding illuminated regions of the two directional light beams on the same display panel are completely or highly overlapped; corresponding reflected regions of the two directional image beams on the same imaging concave mirror are completely or highly overlapped, providing a larger viewing angle difference between the two viewing angles of the two viewing areas.

In addition, the multi-viewing angle floating projection device further includes two adjusting reflectors, each of which is disposed on the optical path between the display panel and the imaging concave mirror. The two directional image beams are first reflected by the two adjusting reflectors respectively and then are projected to the same imaging concave mirror. Each of the adjusting reflectors is a concave mirror or a convex mirror.

Optionally, the multi-viewing angle floating projection device includes more than two directional light sources. The number of the reflectors and the adjusting reflectors are corresponding to the number of the directional light sources; the number of the images displayed time-divisionally by the display panel are also corresponding to the number of the directional light sources; wherein each of the directional light beams illuminates a corresponding image of the display panel to form a directional image beam, which is then reflected by a corresponding reflector, reflected by a corresponding adjusting reflector and projected to the same imaging concave mirror.

The present disclosure further provides a multi-viewing angle floating projection device including two directional light sources, one display panel and two imaging concave mirrors. The display panel is adapted to display images time-divisionally corresponding to the two directional light sources; the two directional light sources are synchronized with the time-divisionally display of the two display panels. The two directional light sources are corresponding to the two imaging concave mirrors, wherein each of the directional light sources is adapted to project a directional light beam. The two directional light beams respectively illuminate corresponding images, which are time-divisionally displayed by the display panel, to form two directional image beams. The directional image beams are reflected by corresponding imaging concave mirrors respectively and then are projected to two viewing areas to form floating projected real images. Corresponding illuminated regions of the two directional light beams on the display panel are completely or highly overlapped, providing a larger viewing angle difference between the two viewing angles of the two viewing areas.

In addition, the multi-viewing angle floating projection device further includes two adjusting reflectors, each of which is disposed on the optical path between the display panel and the two imaging concave mirrors. The two directional image beams are first reflected by the two adjusting reflectors respectively and then are projected to the imaging concave mirrors respectively. Each of the adjusting reflectors is a concave mirror or a convex mirror.

Optionally, the multi-viewing angle floating projection device includes more than two directional light sources. The number of the adjusting reflectors and the imaging concave mirrors are corresponding to the number of the directional light sources; the number of the images displayed time-divisionally by the display panel are also corresponding to the number of the directional light sources; wherein each of the directional light beams illuminates a corresponding image of the display panel to form a directional image beam, which is then reflected by a corresponding adjusting reflector and projected to a corresponding imaging concave mirror.

In addition, in the aforementioned multi-viewing angle floating projection device, a windshield is further provided on the optical path of the two directional image beams projecting to the two viewing areas.

In addition, in the aforementioned multi-viewing angle floating projection device, a paraxial reflector is further provided on the optical path of the two directional image beams before projecting to the imaging concave mirrors.

Optionally, the paraxial reflector is a semi-reflector disposed at a light outlet.

Optionally, the paraxial reflector is a reflective polarizer disposed at a light outlet. A light-emitting side of the display panel is provided with a quarter-wave plate; the reflective polarizer is also provided with a quarter-wave plate at its side facing the imaging concave mirrors.

DETAILED DESCRIPTION

The following embodiments provide a multi-viewing angle floating projection device that allows multiple observers to view clear and bright images simultaneously, and the size of the projection device could be reduced. The multi-viewing angle means that multiple observers can view images at the same time, such as dual viewing angles, triple viewing angles, quad viewing angles or multiple viewing angles, wherein at each of the viewing angles, one or more observers can view with their eyes within the viewing angle. Hereinafter, dual viewing angles suitable for two observers are used in the following embodiments to simplify the description.

Figure 1A:
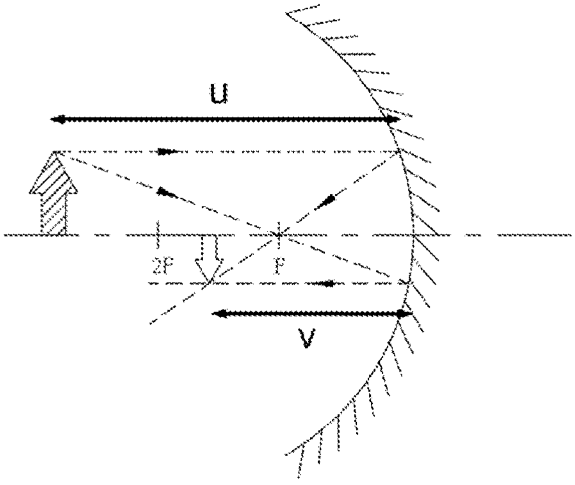
FIG. 1A prior art
FIG. 1A, FIG. 1B, FIG. 1C and FIG. 1D are schematic diagrams of imaging principles of the concave mirror.
Figure 1C:
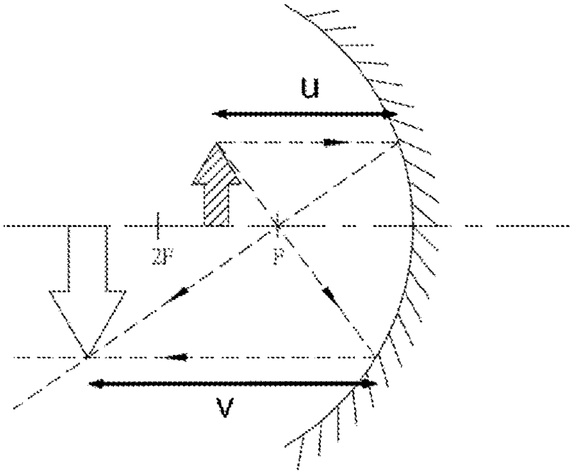
FIG. 1C prior art
Figure 1B:
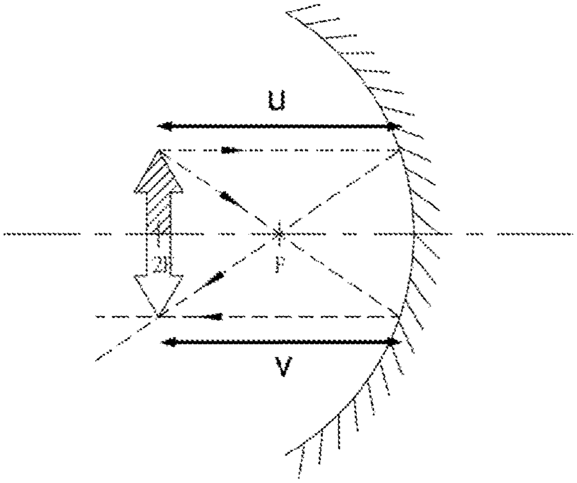
FIG. 1B prior art
Figure 1D:
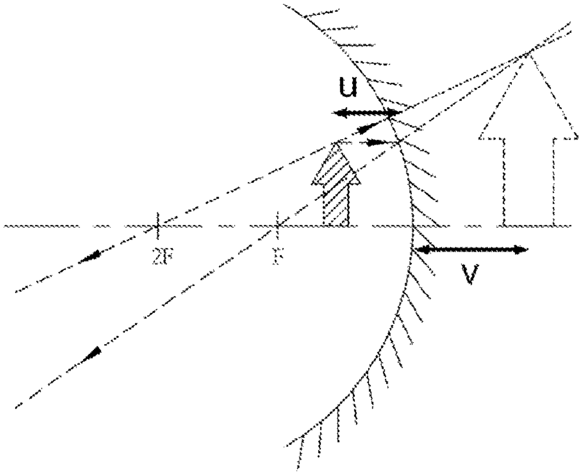
FIG. 1D prior art
Figure 2:
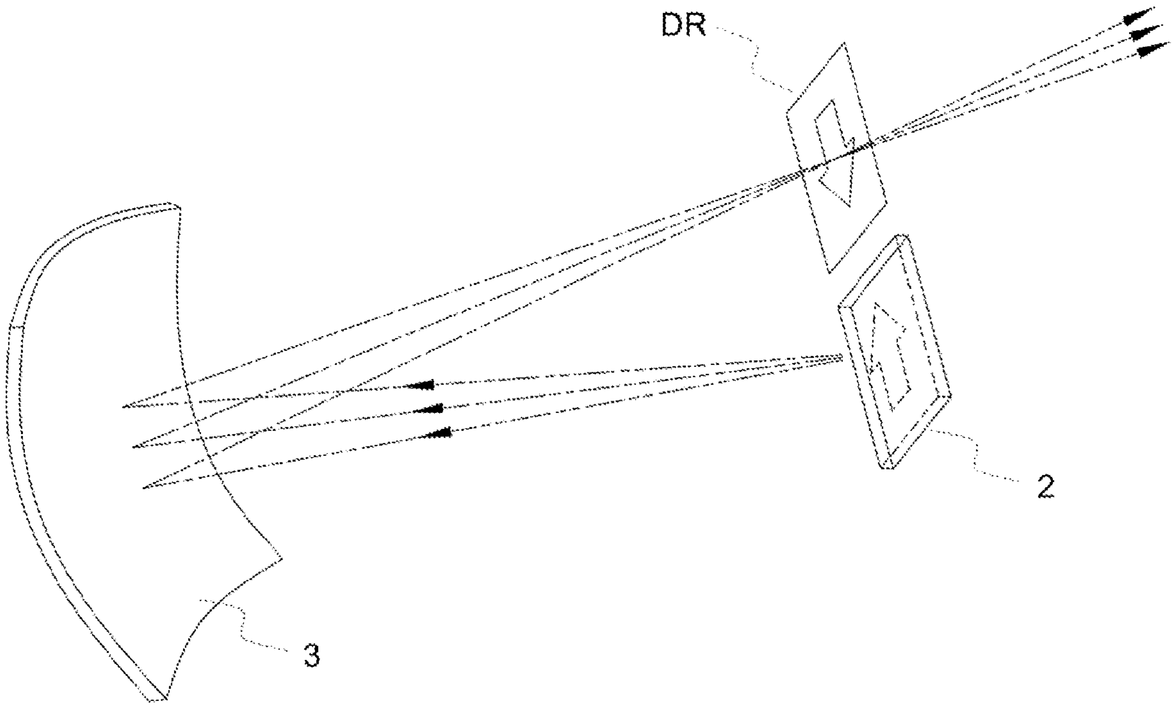
FIG. 2 prior art
FIG. 2 is a schematic diagram of an imaging concave mirror forming a real image.
Figure 3:
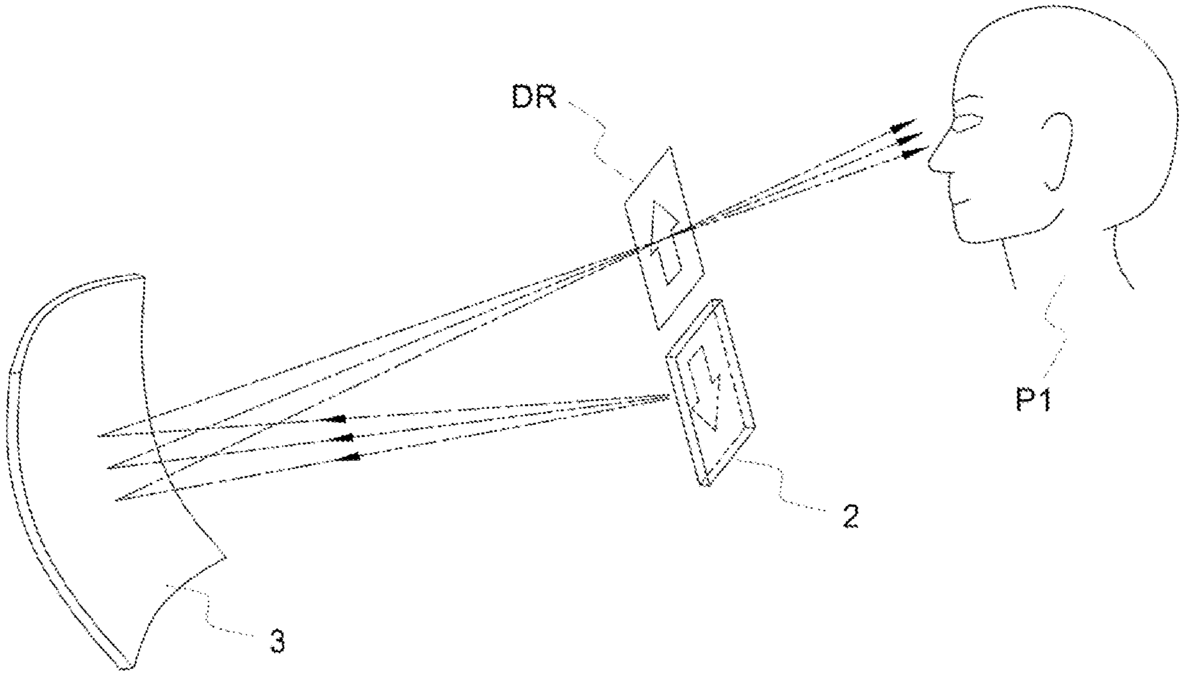
FIG. 3 prior art
FIG. 3 is a schematic diagram of an observer viewing a floating projected real image of an imaging concave mirror.
Figure 4:
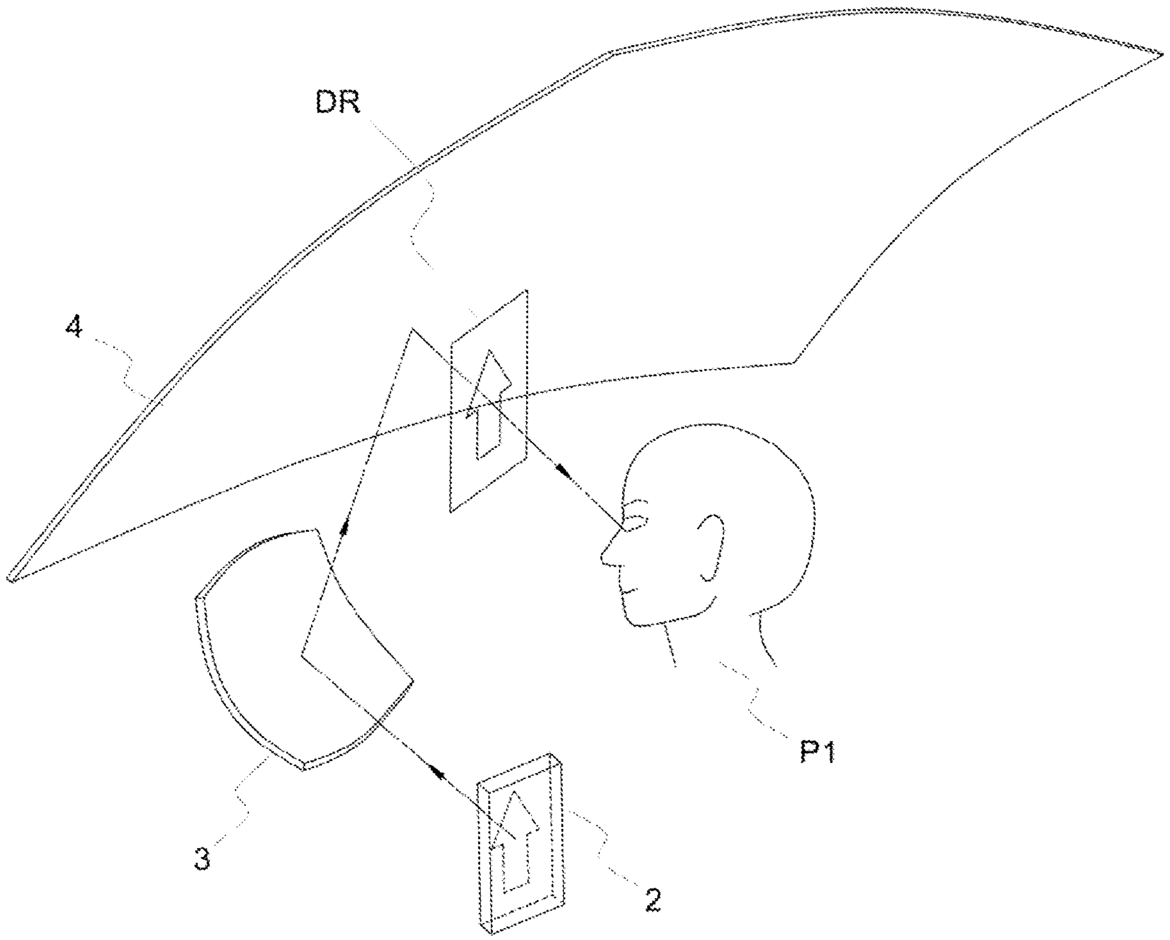
FIG. 4 prior art
FIG. 4 is a schematic diagram of the application of real image floating projection on a vehicle.
Figure 5:
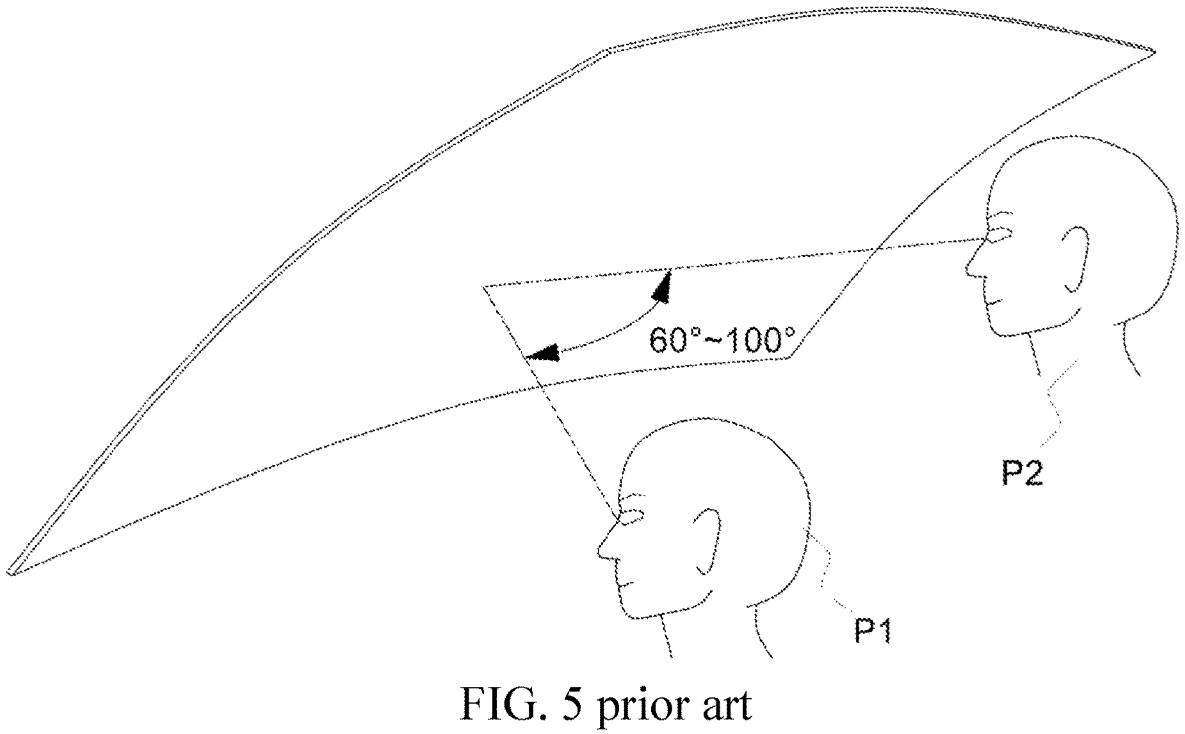
FIG. 5 prior art
FIG. 5 is a schematic diagram of the viewing angle of floating projected real image in the vehicle.
Figure 6A:
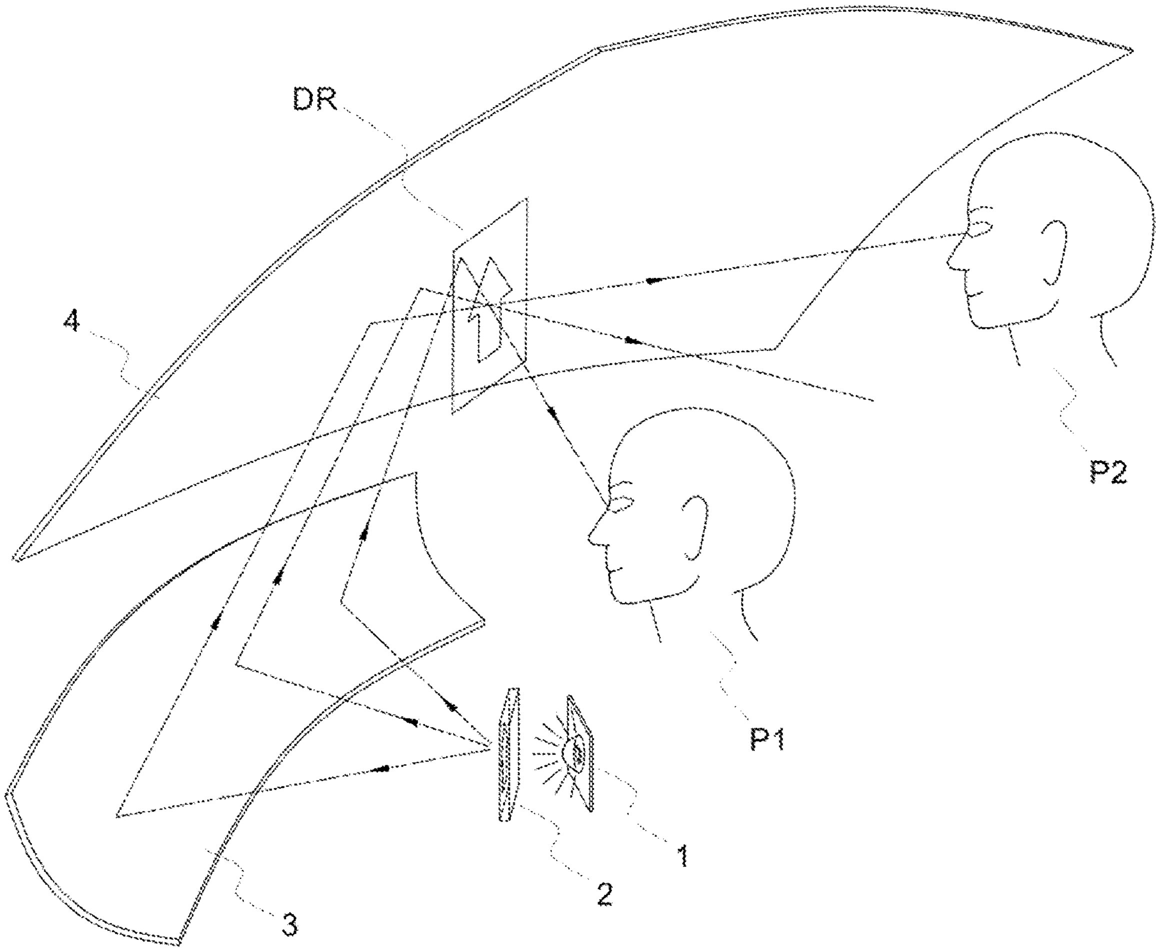
FIG. 6A prior art
FIG. 6A and FIG. 6B are schematic diagrams of the conventional floating projection device for a vehicle.
Figure 6B:
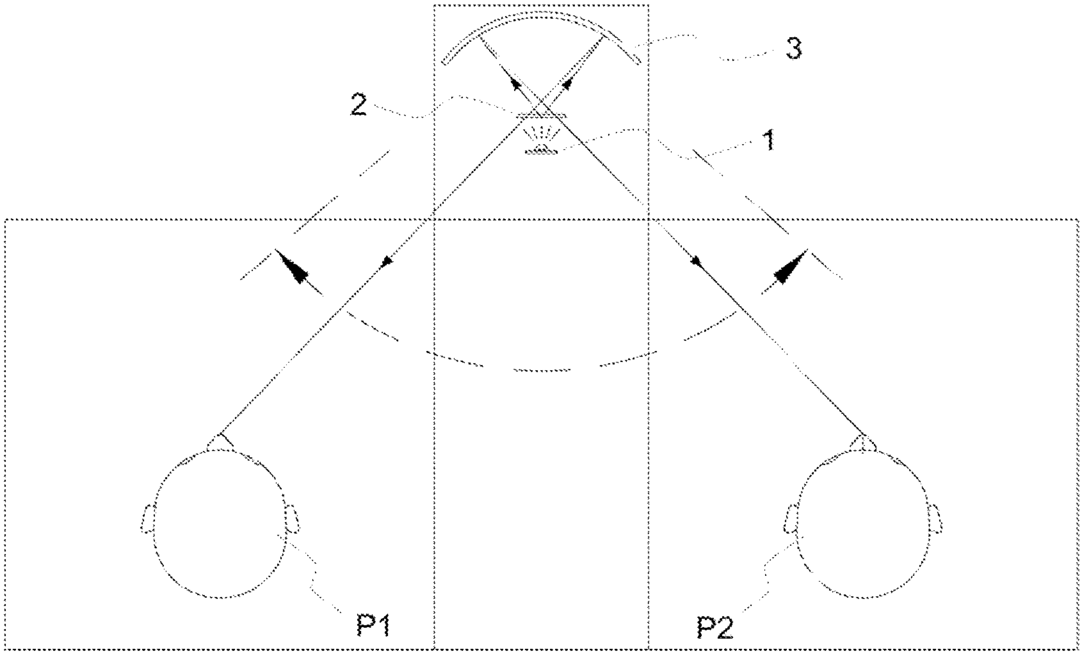
FIG. 6B prior art
Figure 7A:
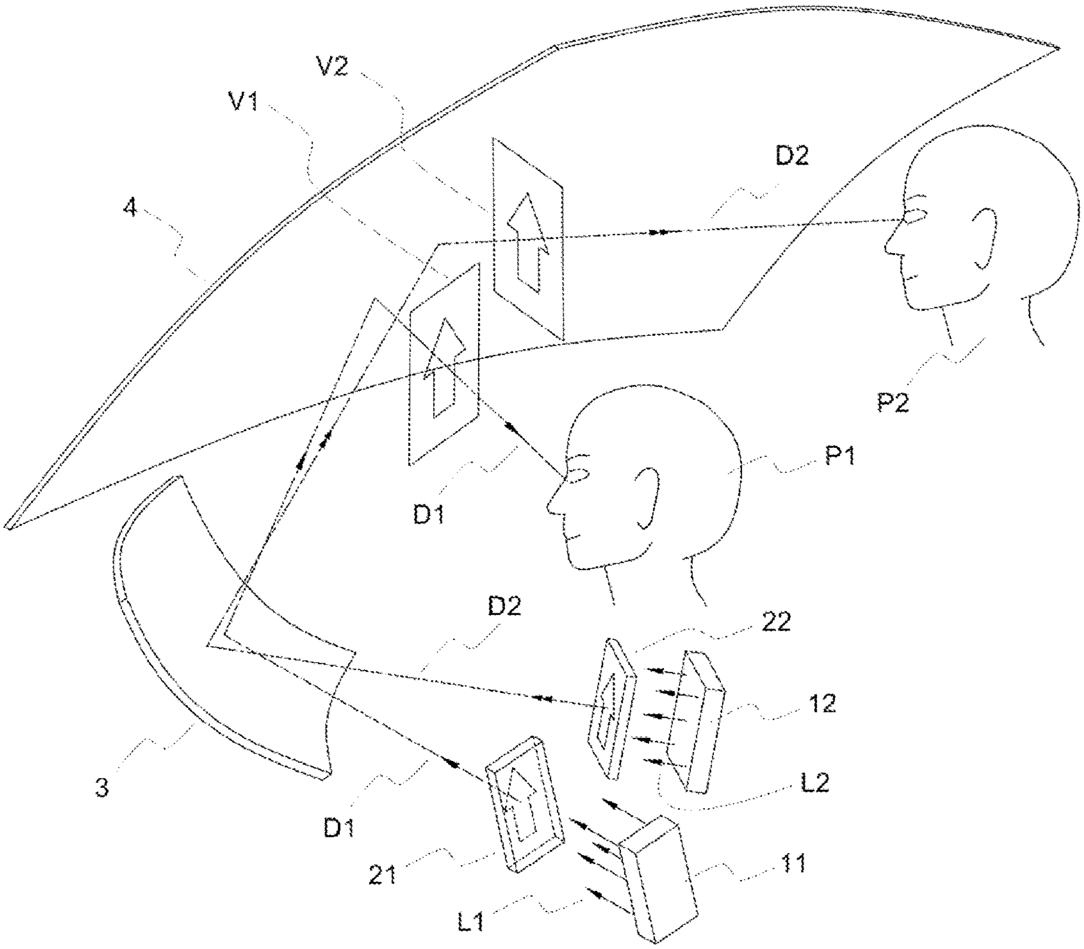
FIG. 7A and FIG. 7B are schematic diagrams of the multi-viewing angle floating projection device according to the first embodiment of the present disclosure.
Figure 7B:
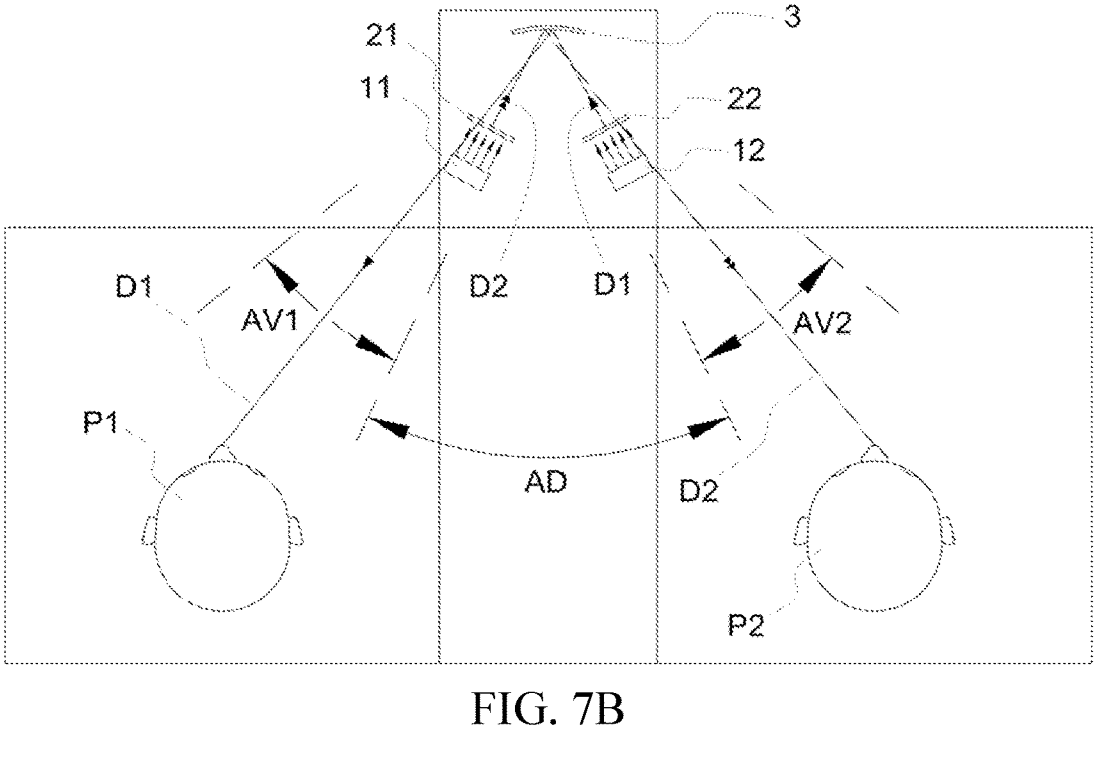

Referring to FIGS. 7A and 7B, showing a multi-viewing angle floating projection device according to an embodiment of the present disclosure which utilizes two directional light sources, two display panels and an imaging concave mirror for generating a real image to form dual viewing angles, wherein the imaging concave mirror is shared. The multi-viewing angle floating projection device includes:

- a first directional light source 11 for projecting a first directional light beam L1;
- a second directional light source 12 for projecting a second directional light beam L2;
- a first display panel 21 for displaying a first image, wherein the first directional light beam L1 illuminates the first display panel 21 to form a first directional image beam D1;
- a second display panel 22 for displaying a second image, wherein the second directional light beam L2 illuminates the second display panel 22 to form a directional image beam D2; and
- an imaging concave mirror 3 for respectively reflecting the first directional image beam D1 and the second directional image beam D2 to a first observer P1 (a driver's viewing area) and a second observer P2 (a front passenger's viewing area) to form two floating projected real images. The first and second directional image beams D1, D2 have their reflected regions completely or highly overlapped with each other on the imaging concave mirror 3. For example, the overlapped ratio of the reflected regions is greater than 70%. In addition, there is a larger viewing angle difference AD between the two viewing angles AV1 and AV2 of the two viewing areas, for example, the viewing angle difference AD is greater than 30 degrees.

In this embodiment, a windshield 4 is further provided on the optical paths of the directional image beams D1, D2 projecting from the imaging concave mirror 3 to the first observer P1 and the second observer P2. The first directional image beam D1 and the second directional image beam D2 are first projected to the windshield 4, and then reflected to the first observer P1 and the second observer P2, respectively.

By adjusting the angles of the first directional light source 11, the second directional light source 12, the first display panel 21, and the second display panel 22, it is able to share the same imaging concave mirror 3, thereby reducing the area of the imaging concave mirror 3. For example, as comparing with the conventional arts, over 35% of the area on the imaging concave mirror 3 could be reduced, and also achieving clear, bright, floating projection which could be viewed with multi-viewing angles simultaneously and reducing assembling space and lowering the cost.

In addition, the two directional image beams D1, D2 are respectively projected to the first observer P1 and the second observer P2 and form projected real images V1, V2 in midair. The first display panel 21 and the second display panel 22 could display the same or different images, such that the first observer P1 and the second observer P2 can view the same or different images at the same time.

The directional light source includes, for example, light source with lens-type collimator, light source with reflective-type collimator, light source array with lens-type collimator array, or light source with micro-mirror array reflective diffuser, etc., and it is not limited thereto.

Figure 8A:
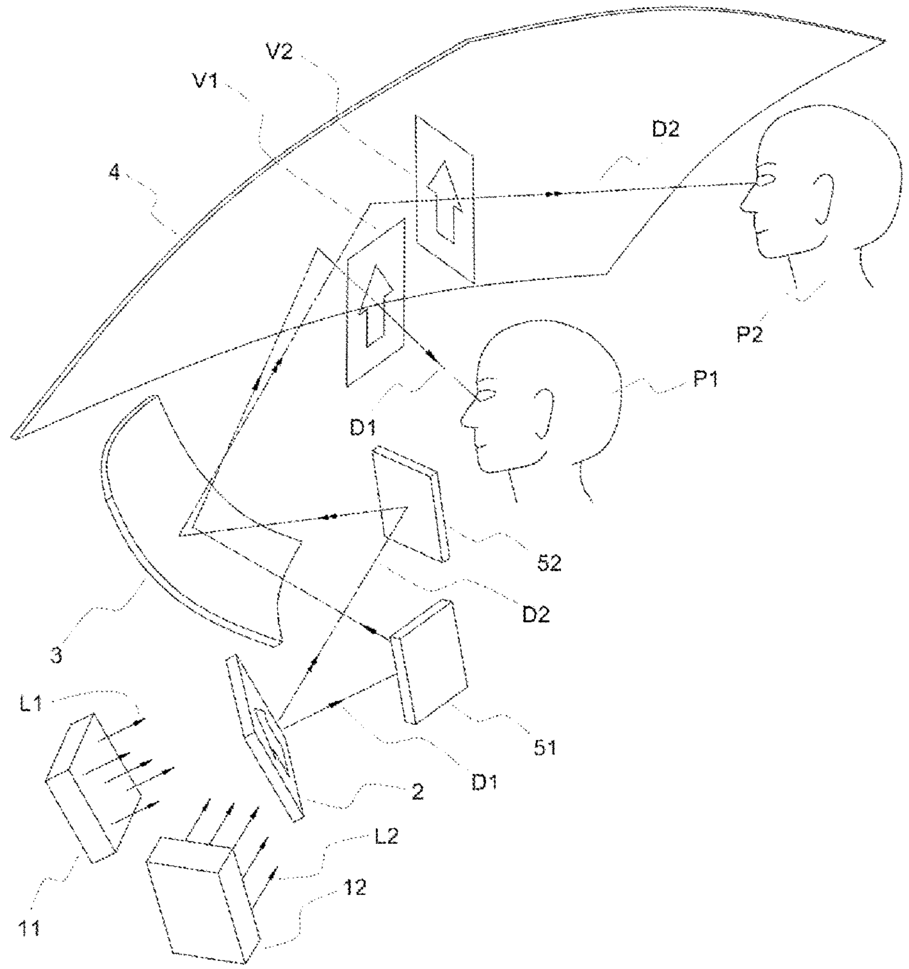
FIG. 8A and FIG. 8B are schematic diagrams of the multi-viewing angle floating projection device according to the second embodiment of the present disclosure.
Figure 8B:
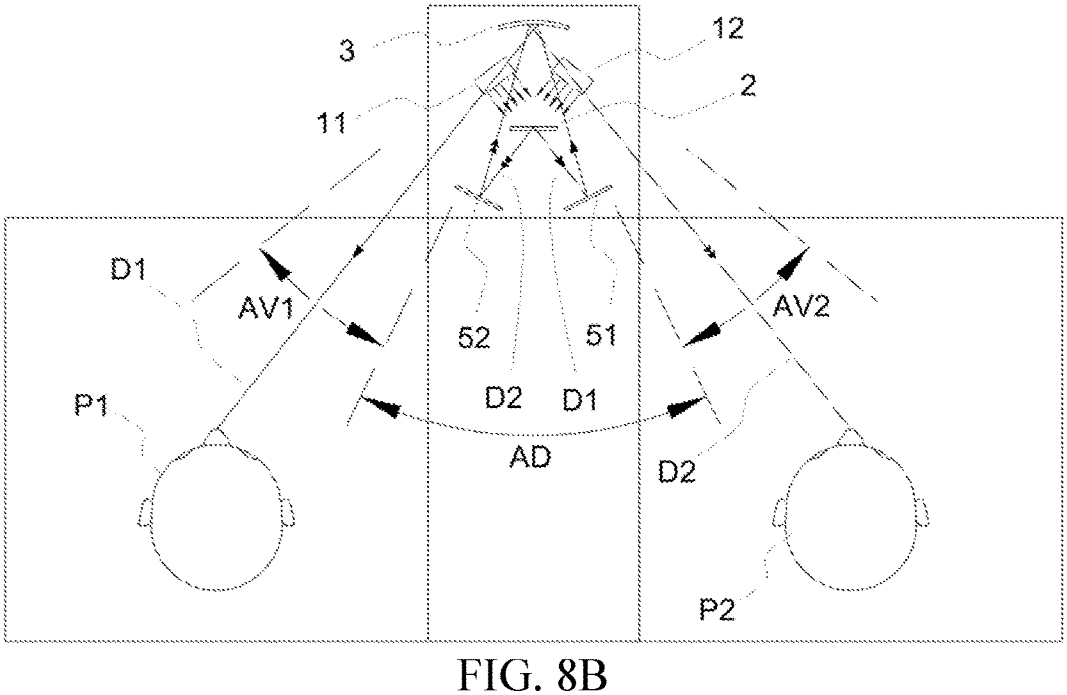

Referring to FIGS. 8A and 8B, showing a multi-viewing angle floating projection device according to an embodiment of the present disclosure which utilizes two directional light sources, two reflectors, a display panel and an imaging concave mirror for generating real images to form dual viewing angles, wherein the display panel and the imaging concave mirror are shared. The multi-viewing angle floating projection device includes:

- a first directional light source 11 for projecting a first directional light beam L1;
- a second directional light source 12 for projecting a second directional light beam L2;
- a display panel 2 for time-divisionally displaying images corresponding to the two directional light sources, wherein the switching of the two directional light sources is synchronized with the time-divisionally display of the display panel 2; the first directional light beam L1 and the second directional light beam L2 illuminates a corresponding image displayed time-divisionally on the display panel 2 to respectively form a first directional image beam D1 and a second directional image beam D2, wherein the illuminated regions of the two directional light beams L1, L2 on the display panel are completely or highly overlapped, for example, the overlapped ratio of the illuminated regions is greater than 70%;

A first reflector 51 and a second reflector 52, which are both plane mirrors, are respectively disposed on the optical paths of the directional image beams D1, D2 projecting from the display panel 2 to an imaging concave mirror 3. The first directional image beam D1 and the second directional image beam D2 are projected from the display panel 2 toward directions separating from each other, and the optical paths thereof are changed by reflection of the first reflector 51 and the second reflector 52 so that the first directional image beam D1 and the second directional image beam D2 are directed to the same imaging concave mirror 3. The first directional image beam D1 and the second directional image beam D2 are then reflected by the imaging concave mirror 3, and projected to the first observer P1 (a driver's viewing area) and a second observer P2 (a front passenger's viewing area) respectively, thereby forming two floating projected real images, wherein the reflected regions of the directional image beams D1, D2 on the imaging concave mirror 3 are completely or highly overlapped, for example, the overlapped ratio of the reflected regions is greater than 70%. In addition, there is a larger viewing angle difference AD between the two viewing angles AV1 and AV2 of the two viewing areas, for example, the viewing angle difference AD is greater than 30 degrees.

In this embodiment, a windshield 4 is further provided on the optical paths of the directional image beams D1, D2 projecting from the imaging concave mirror 3 to the first observer P1 and the second observer P2. The function of the windshield 4 is similar to that of the aforementioned embodiment, and it will not be repeated here.

By adjusting the angles of the first directional light source 11, the second directional light source 12, the first reflector 51, and the second reflector 52, it is able to share the same display panel 2 and the same imaging concave mirror 3, thereby reducing the area of the imaging concave mirror 3, and also achieving clear, bright, floating projection which could be viewed with multi-viewing angles simultaneously, and reducing assembling space and lowering the cost.

Figure 9A:
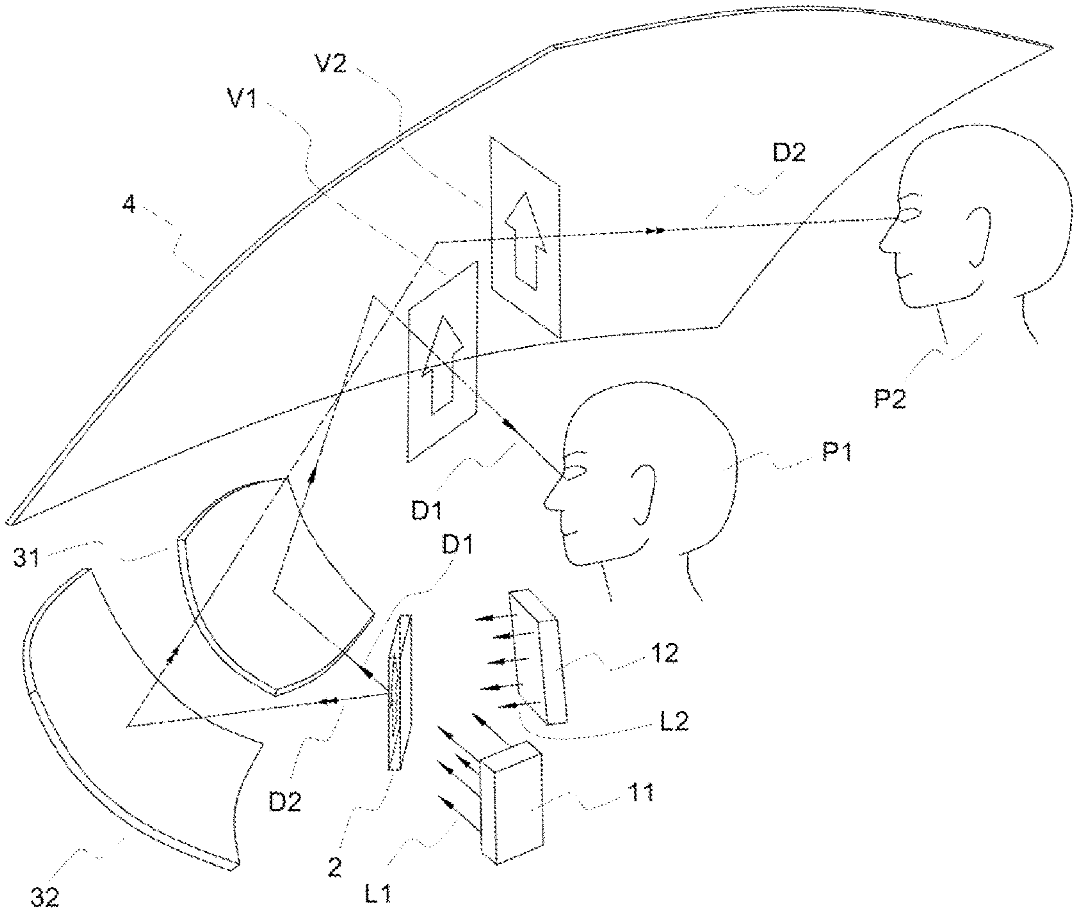
FIG. 9A and FIG. 9B are schematic diagrams of the multi-viewing angle floating projection device according to the third embodiment of the present disclosure.
Figure 9B:
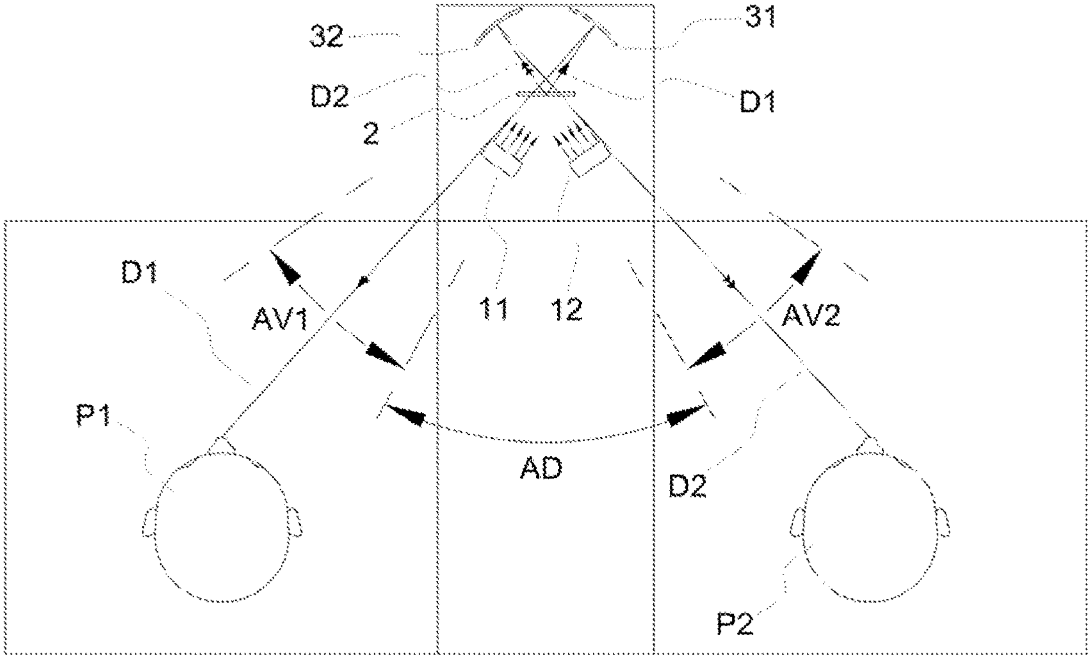

Referring to FIGS. 9A and 9B, showing a multi-viewing angle floating projection device according to an embodiment of the present disclosure which utilizes two directional light sources, two imaging concave mirrors for generating real images to form dual viewing angles, wherein the display panel is shared. The multi-viewing angle floating projection device includes:

a first directional light source 11 for projecting a first directional light beam L1;

a second directional light source 12 for projecting a second directional light beam L2;

a display panel 2 for time-divisionally displaying images corresponding to the two directional light sources, wherein the switching of the two directional light sources is synchronized with the time-divisional display of the display panel 2; the first directional light beam L1 and the second directional light beam L2 illuminates a corresponding image displayed time-divisionally on the display panel 2 to respectively form a first directional image beam D1 and a second directional image beam D2, wherein the illuminated regions of the two directional light beams L1, L2 on the display panel are completely or highly overlapped, for example, the overlapped ratio of the illuminated regions is greater than 70%;

a first imaging concave mirror 31 for reflecting a first directional image beam D1;

a second imaging concave mirror 32 for reflecting a second directional image beam D2;

The first directional image beam D1 is reflected by the first imaging concave mirror 31 to a first observer P1 (a driver's viewing area) and the second directional image beam D2 is reflected by the second imaging concave mirror 32 to a second observer P2 (a front passenger's viewing area) respectively, thereby forming two floating projected real images. In addition, there is a larger viewing angle difference AD between the two viewing angles AV1 and AV2 of the two viewing areas, for example, the viewing angle difference AD is greater than 30 degrees.

In this embodiment, a windshield 4 is further provided on the optical paths of the directional image beams D1, D2 projecting from the first imaging concave mirror 31 and the second imaging concave mirror 32 to the first observer P1 and the second observer P2. The function of the windshield 4 is similar to that of the aforementioned embodiments, and it will not be repeated here.

By adjusting the angles of the first directional light source 11, the second directional light source 12, the first imaging concave mirror 31, and the second imaging concave mirror 32, it is able to share the same display panel 2, and also achieving clear, bright, floating projection which could be viewed with multi-viewing angles simultaneously and reducing assembling space and lowering the cost.

In addition, the two directional image beams D1, D2 are respectively projected to the first observer P1 and the second observer P2 and form projected real images V1, V2 in midair. The time-divisionally displayed images of the display panel 2 could be the same or different. When the displayed images are the same, the two directional light beams L1, L2 could either continue to illuminate without switching time-divisionally, or switching synchronized with the time-divisional display of the display panel 2; when the displayed images are different, the switching of the two directional light beams L1, L2 is synchronized with the time-divisional display of the display panel 2; therefore, the first observer P1 and the second observer P2 can view the same or different images at the same time. The switching time is shorter than the visual persistence of human eyes, for example, 0.1 seconds, such that the observers P1, P2 will not feel interrupted at viewing the images.

Figure 10:
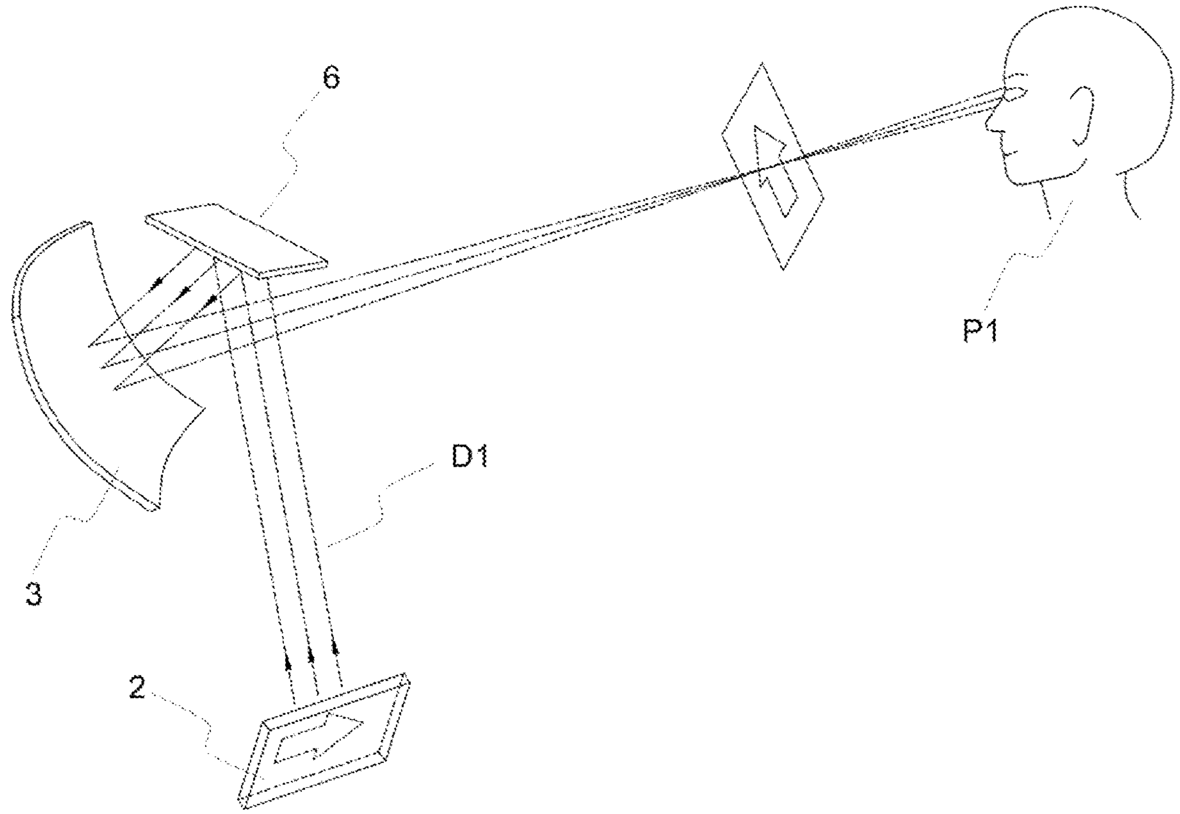
FIG. 10 is a schematic diagram of the multi-viewing angle floating projection device of the aforementioned embodiments having a paraxial reflector.

As shown in FIG. 10, in the aforementioned embodiments, before being projected to the imaging concave mirror 3, the directional image beam D1 is first reflected by a paraxial reflector 6 and then projected to the imaging concave mirror 3. The paraxial reflector 6 could be a plane mirror to fold the optical path, thereby making the incident and reflected light on the imaging concave mirror 3 be both paraxial optical paths to reduce spherical aberration and improve image quality. It is also more flexible in placing the display panel 2 and other components on the optical path.

Figure 11:
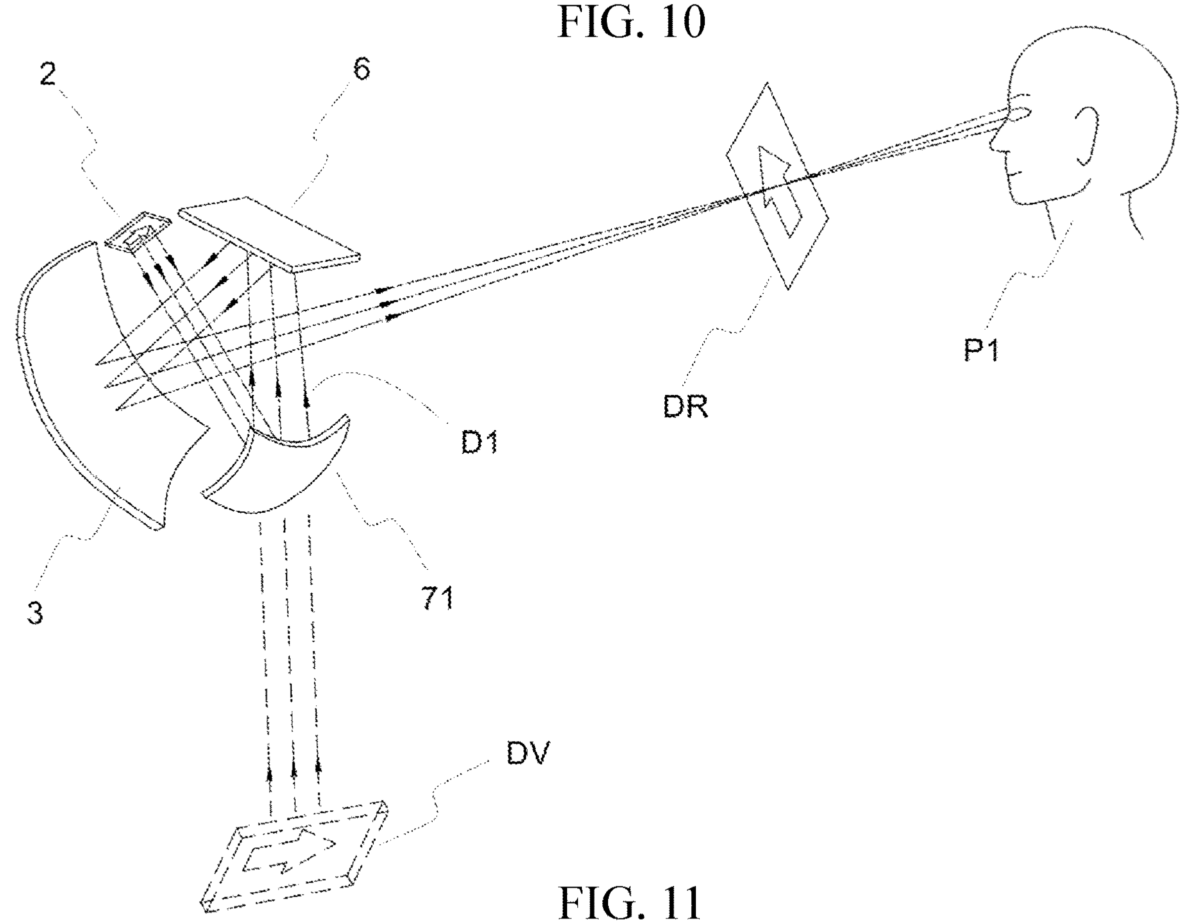
FIG. 11 is a schematic diagram of the multi-viewing angle floating projection device of the aforementioned embodiments having a concave adjusting reflector.

As shown in FIG. 11, in the aforementioned embodiments, an adjusting reflector, such as a concave adjusting reflector 71, could be further provided between the display panel 2 and the paraxial reflector 6 on the optical path of the directional image beam D1 to form an enlarged virtual image DV. In this way, a smaller display panel 2 and a shorter object distance could be utilized to achieve the floating projection having a similar scale as the previous embodiments. That is, by using the adjusting reflector 71, it is favorable to adjust the scale of the image source and the object distance.

Figure 12:
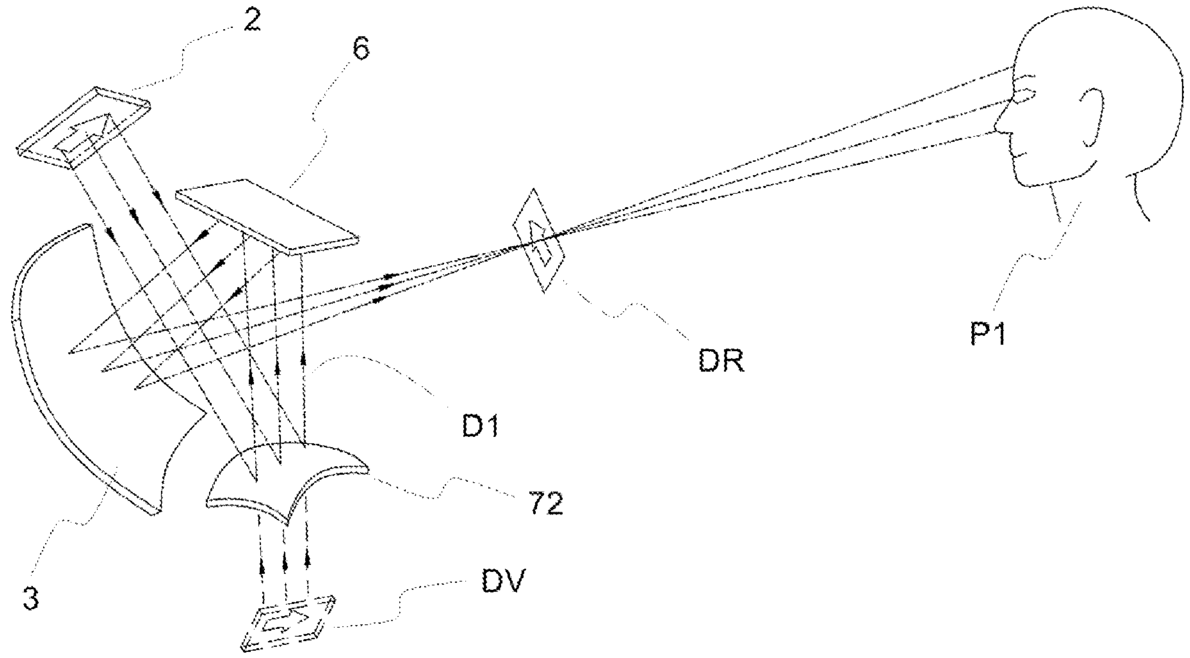
FIG. 12 is a schematic diagram of the multi-viewing angle floating projection device of the aforementioned embodiments having a convex adjusting reflector.

As shown in FIG. 12, in the aforementioned embodiments, the adjusting reflector also could be a convex adjusting reflector 72 for forming a reduced virtual image DV, thereby adjusting the scale of the image source and the object distance.

Figure 13A:
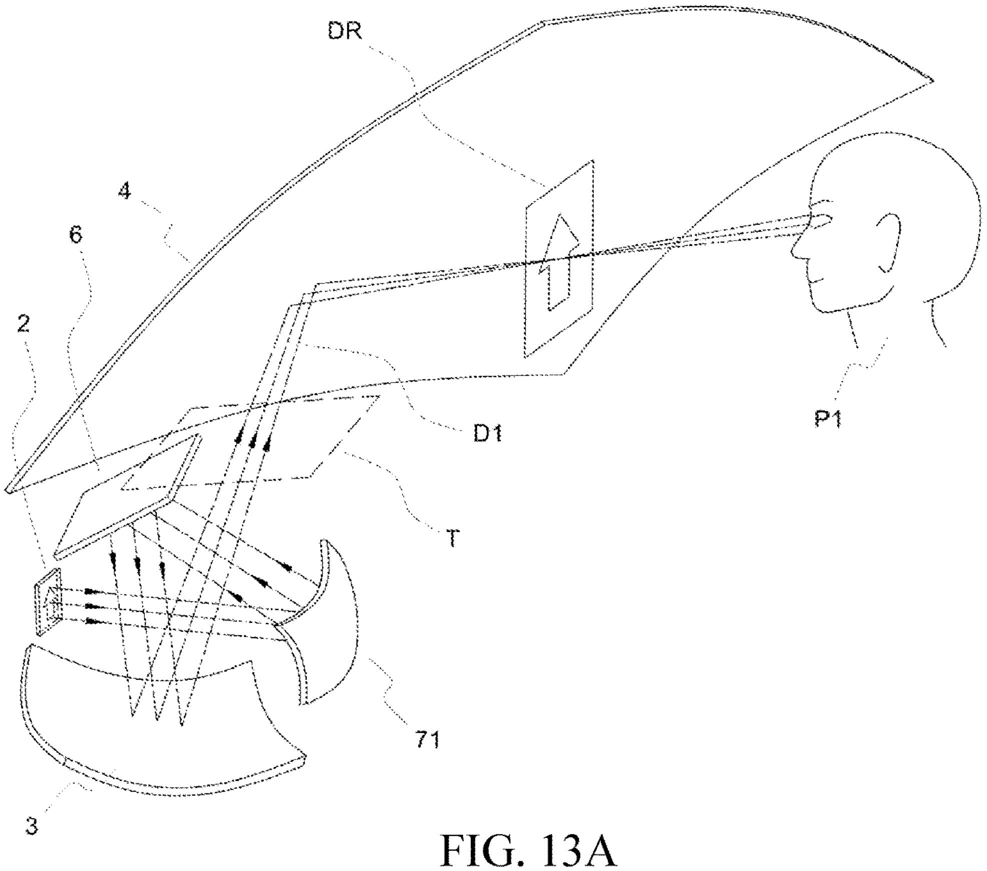
FIG. 13A is a schematic diagram of the image beams passing through the light outlet of the multi-viewing angle floating projection device of the aforementioned embodiments.

As shown in FIG. 13A, in the aforementioned embodiments, if the directional image beam D1 reflected by the imaging concave mirror 3 passed through the light outlet T and then be projected to the windshield 4, the optical path between the imaging concave mirror 3 and the windshield 4 shall be close to the optical axis of the imaging concave mirror 3 and to avoid the paraxial reflector 6, resulting limited space for use.

Figure 13B:
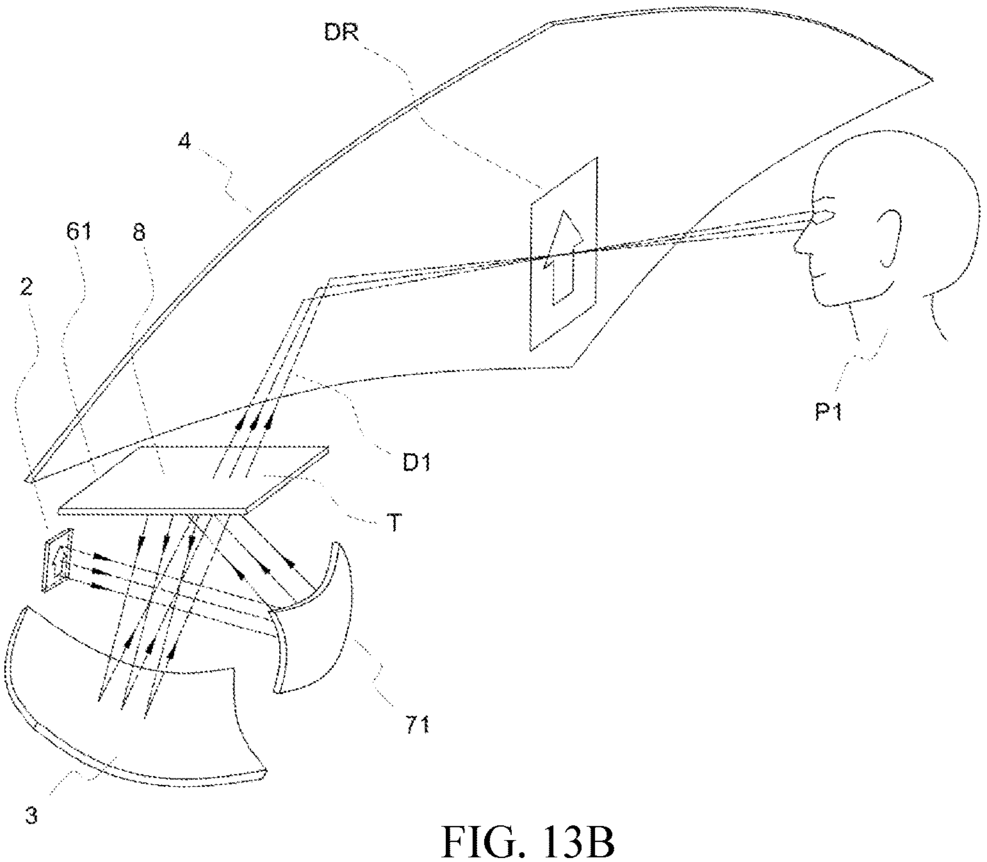
FIG. 13B is a schematic diagram of the multi-viewing angle floating projection device of the aforementioned embodiments having a semi-reflector at the light outlet.

As shown in FIG. 13B, based on the aforementioned embodiments, the paraxial reflector 6 could be a semi-reflective and semi-transmissive optical element, such as a semi-reflector 61 with 50% reflection and 50% transmission, and the semi-reflector 61 could be disposed at the light outlet T. In this way, the directional image beam D1 reflected by the adjusting reflector 71 is projected to the semi-reflector 61 for the first time, and part of the directional image beam D1 is reflected to the imaging concave mirror 3; then the directional image beam D1 reflected by the imaging concave mirror 3 is projected to the semi-reflector 61 again and partially transmitted through the semi-reflector 61 to incident on the windshield 4. With this design, it is favorable to maintain a paraxial optical path and could reduce the demand space. It could also reduce the amount of external light passing through the light outlet T and traveling into the internal optical path so as to prevent the display panel 2 from being damaged by sunlight.

The semi-reflector 61 could be provided with an anti-reflection film 8 on its surface facing the windshield 4 to reduce the glare caused by sunlight or external light reflected by the semi-reflector 61 to the observer, thus avoiding disturbance to the driver and the front passenger.

Figure 14A:
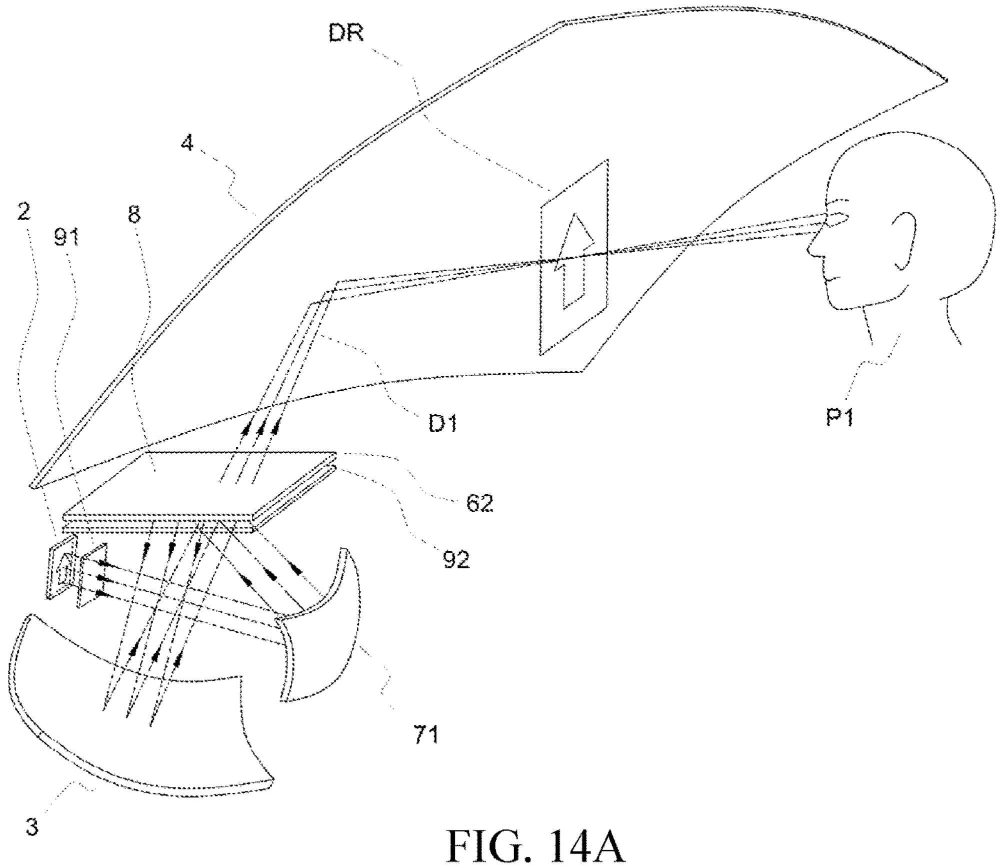
FIGS. 14A and 14B are schematic diagrams of the multi-viewing angle floating projection device of the aforementioned embodiments having a reflective polarizer at the light outlet.

As shown in FIG. 14A, it is another method to reduce the amount of external light passing through the light outlet T and entering the internal optical path. It is known that when light passes through glass, the transmittance of the polarized P wave component is higher than that of the polarized S wave component. Especially when the incident angle equals to Brewster's angle, the transmittance of the polarized P wave component is close to 100%, that is, almost all of which could be transmitted, while the transmittance of the polarized S wave component becomes lower with increasing of the incident angle. In this embodiment, a polarization beam splitter is utilized to replace the paraxial reflector 6 of the aforementioned embodiments to reflect and transmit image beams with different polarization states. For example, a reflective polarizer 62 is utilized to reflect the polarized P wave component and transmit the polarized S wave component. The reflective polarizer 62 could block the polarized P wave component of sunlight or external light penetrating the windshield 4 and allow a high percentage of the polarized S wave component of the directional image beam D1 to pass through the light outlet T and be reflected by the windshield 4 to the observer. Correspondingly, phase retarders could be provided at the light emitting side of the display panel 2 and the side of the reflective polarizer 62 facing the imaging concave mirror 3, respectively. The phase retarders could be, for example, quarter-wave plates 91, 92 for conversion polarization state of the directional image beam D1.

The reflective polarizer 62 could be provided with an anti-reflection film 8 on its side facing the windshield 4. The function of the anti-reflection film 8 is similar to that of the aforementioned embodiments, and it will not be repeated here.

Figure 14B:
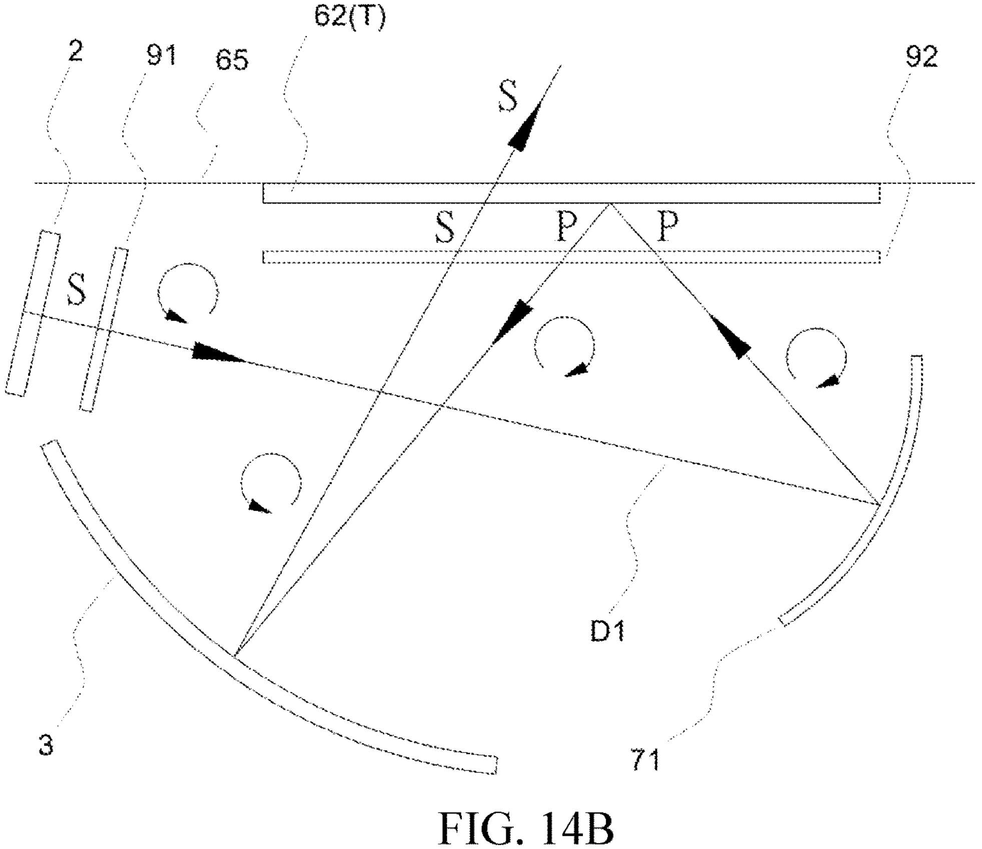

Referring to FIG. 14B, showing the optical path of the polarization conversion method according to FIG. 14A. The first quarter-wave plate 91 is adjacent to the light-emitting side of the display panel 2 and does not block the optical paths of the light incident on and reflecting from the imaging concave mirror 3. The second quarter-wave plate 92 faces the imaging concave mirror 3 and is adjacent to one side of the reflective polarizer 62 at the light outlet T, wherein the second quarter-wave plate 92 does not block the optical path of the directional image beam D1 projected from the display panel 2 to the adjusting reflector 71. The directional image beam D1 projected from the display panel 2 is S-polarized light, and the S-polarized light is converted into left circularly polarized light by the first quarter-wave plate 91. After the directional image beam D1 is reflected by the adjusting reflector 71, it is converted into right circularly polarized light. The directional image beam D1 passes through the second quarter-wave plate 92 for the first time and is converted into P-polarized light. Then, the P-polarized light is reflected by the reflective polarizer 62 and projected to the second quarter-wave plate 92; the directional image beam D1 passes through the second quarter-wave plate 92 for the second time and is converted into right circularly polarized light. Next, the directional image beam D1 is reflected by the imaging concave mirror 3 and converted into left circularly polarized light, and then is projected to and passes through the second quarter-wave plate 92 for the third time, wherein the left circularly polarized light is converted into S-polarized light. The S-polarized light transmits through the paraxial reflective polarizer 62 to project out from the light outlet T.

Figure 15A:
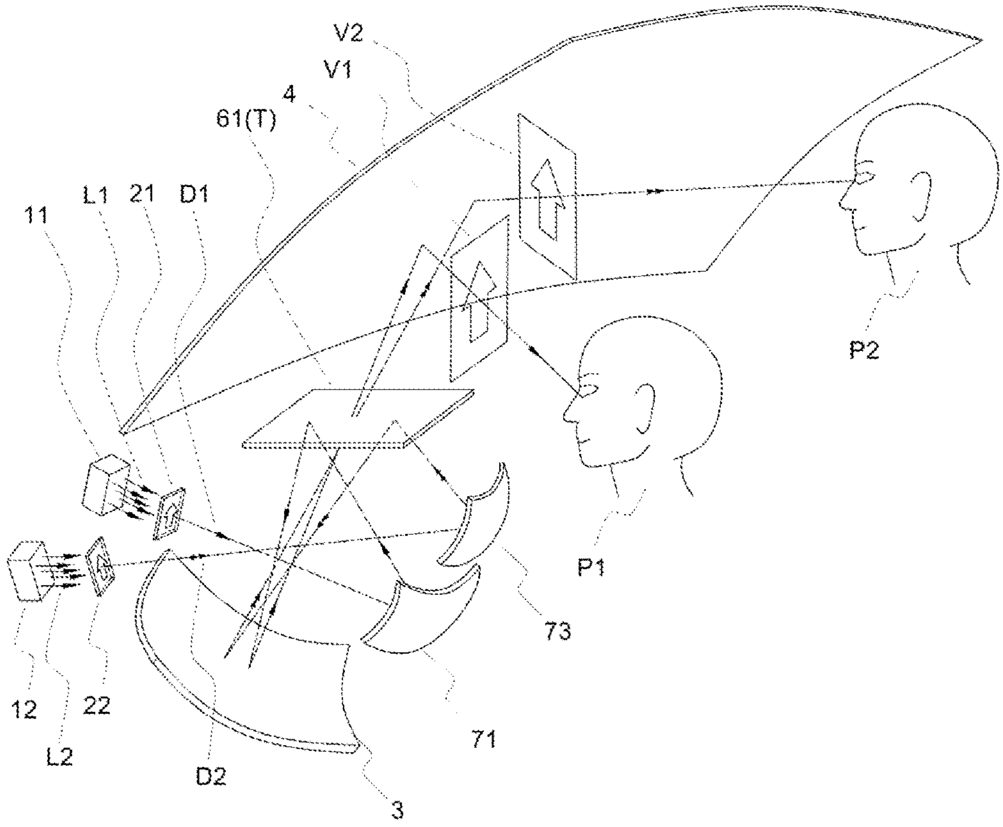
FIG. 15A is a schematic diagram of the multi-viewing angle floating projection device according to the fourth embodiment of the present disclosure.

FIG. 15A shows a multi-viewing angle floating projection device of an embodiment according to the present disclosure which combines the features disclosed in the embodiment shown as FIG. 7A,7B and FIG. 13B. The optical elements of the multi-viewing angle floating projection device utilize an imaging concave mirror 3 to project real images V1, V2 through a semi-reflector 61 at a light outlet T, wherein the imaging concave mirror 3 is shared. For example, when the projected real image V1 is to be formed, the first directional light beam L1 projected by the first directional light source 11 illuminates the first display panel 21 to form the first directional image beam D1. The first directional image beam D1 is then projected to the adjusting reflector 71, reflected by the adjusting reflector 71 and projected to the semi-reflector 61. The first directional image beam D1 is partially reflected by the semi-reflector 61 to the imaging concave mirror 3, reflected by the imaging concave mirror 3 and partially transmitted through the light outlet T of the semi-reflector 61. The transmitted first directional image beam D1 is projected to the windshield 4 and finally forms the floating projected real image V1 reaching the first observer P1 (a driver's viewing area). The optical path of forming the projected real image V2 is similar to the optical path of the projected real image V1, and the first and second directional image beams D1, D2 have their reflected regions completely or highly overlapped with each other on the imaging concave mirror 3.

Figure 15B:
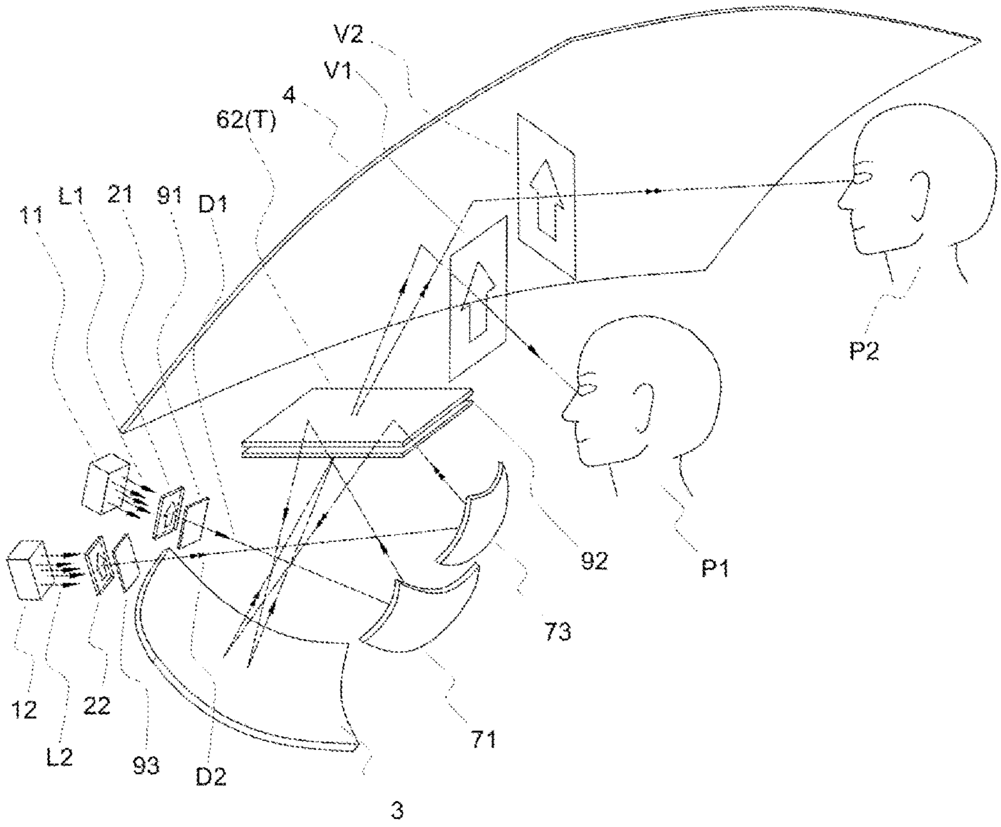
FIG. 15B is a schematic diagram of the multi-viewing angle floating projection device according to the fifth embodiment of the present disclosure.

FIG. 15B shows a multi-viewing angle floating projection device of an embodiment according to the present disclosure which combines the features disclosed in the embodiment shown as FIG. 7A,7B and FIG. 14B. The optical elements of the multi-viewing angle floating projection device utilize an imaging concave mirror 3 to project real images V1, V2 through a reflective polarizer 62 at a light outlet T, wherein the imaging concave mirror 3 is shared. For example, when the projected real image V1 is to be formed, the first directional light beam L1 transmitted through the first display panel 21 and the first quarter-wave plate 91 to form the first directional image beam D1. After the first directional image beam D1 is reflected by the adjusting reflector 71, the first directional image beam D1 is transmitted through the second quarter-wave plate 92 and projected to the reflective polarizer 62. Next, the first directional image beam D1 is reflected by the reflective polarizer 62 and transmitted through the second quarter-wave plate 92 for the second time to project to the imaging concave mirror 3. Then, the first directional image beam D1 is reflected by the imaging concave mirror 3, transmitted through the second quarter-wave plate 92 for the third time and projected through the light outlet T form the reflective polarizer 62. The transmitted first directional image beam D1 is projected to the windshield 4 and finally forms the floating projected real image V1 reaching the first observer P1 (a driver's viewing area). The optical path of forming the projected real image V2 is similar to the optical path of the projected real image V1, and the first and second directional image beams D1, D2 have their reflected regions completely or highly overlapped with each other on the imaging concave mirror 3.

Figure 16A:
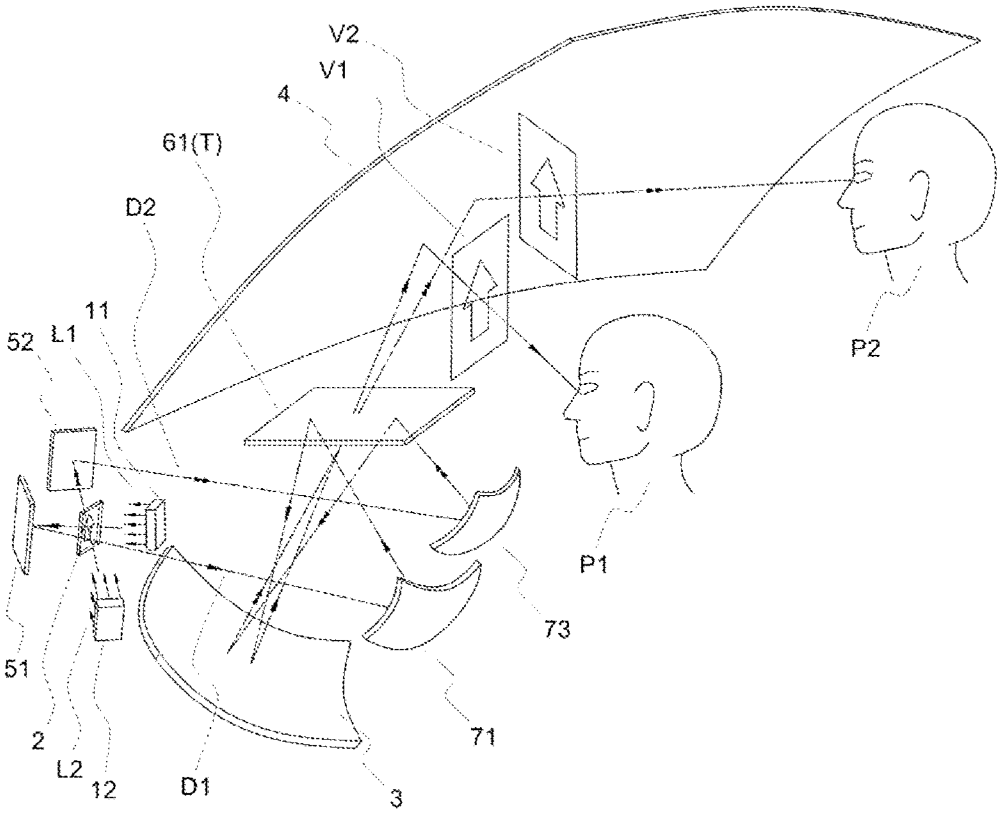
FIG. 16A is a schematic diagram of the multi-viewing angle floating projection device according to the sixth embodiment of the present disclosure.

FIG. 16A shows a multi-viewing angle floating projection device of an embodiment according to the present disclosure which combines the features disclosed in the embodiment shown as FIG. 8A,8B and FIG. 13B. The optical elements of the multi-viewing angle floating projection device utilize a display panel 2 and an imaging concave mirror 3 to project real images V1, V2 through a semi-reflector 61 at the light outlet T, wherein the display panel 2 and the imaging concave mirror 3 are shared. For example, when the projected real image V1 is to be formed, the first directional light beam L1 projected by the first directional light source 11 illuminates the display panel 2 to form the first directional image beam D1. The first directional image beam D1 is first reflected by the first reflector 51 and then is projected to the adjusting reflector 71, reflected by the adjusting reflector 71 and projected to the semi-reflector 61. The first directional image beam D1 is partially reflected by the semi-reflector 61 to the imaging concave mirror 3, reflected by the imaging concave mirror 3 and partially transmitted through the light outlet T of the semi-reflector 61. The transmitted first directional image beam D1 is projected to the windshield 4 and finally forms the floating projected real image V1 reaching the first observer P1 (a driver's viewing area). The optical path of forming the projected real image V2 is similar to the optical path of the projected real image V1, and the first and second directional light beams L1, L2 have their illuminated regions completely or highly overlapped with each other on the display panel 2. The first directional image beam D1 and the second directional image beam D2 are projected from the display panel 2 toward directions separating from each other, and the optical paths thereof are changed by utilizing the first reflector 51 and the second reflector 52 such that the first directional image beam D1 and the second directional image beam D2 are converged onto the same imaging concave mirror 3.

Figure 16B:
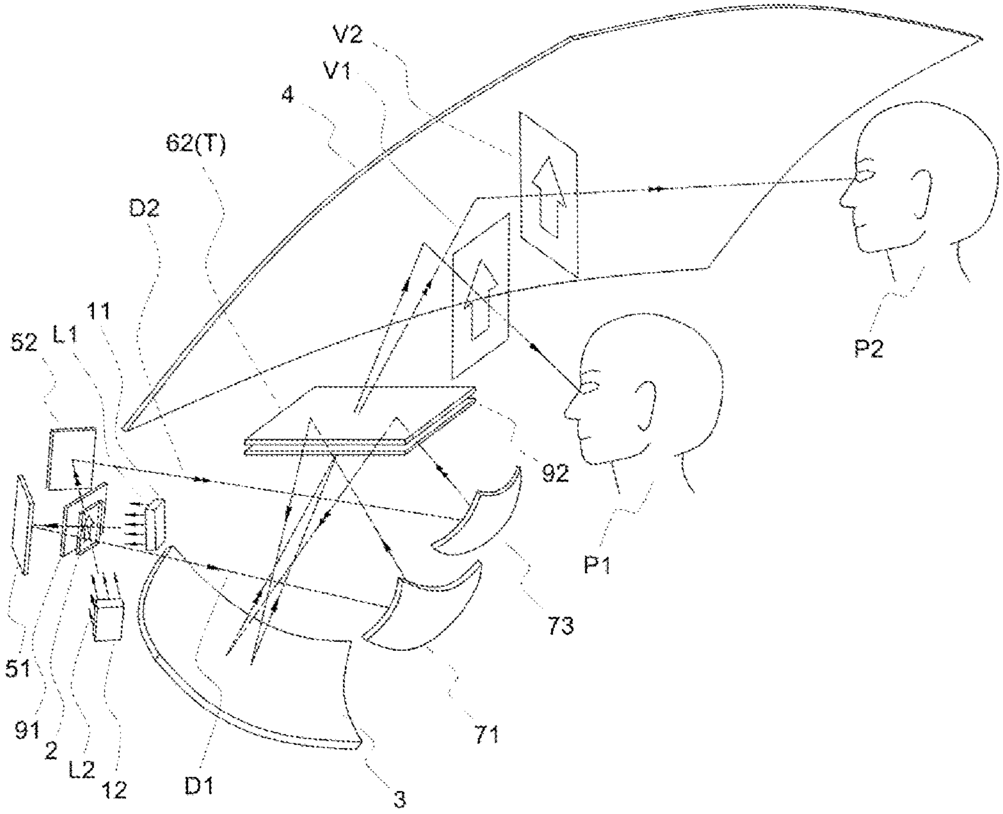
FIG. 16B, FIG. 16C and FIG. 16D are schematic diagrams of the multi-viewing angle floating projection device according to the seventh embodiment of the present disclosure.
Figure 16C:
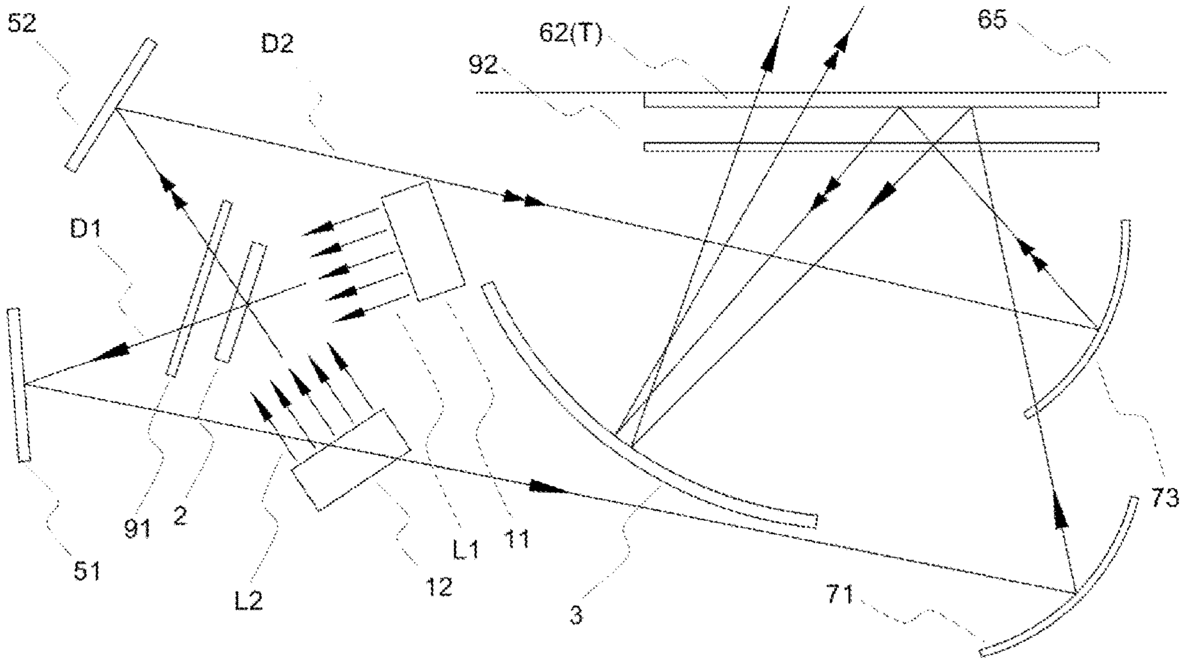

FIG. 16B shows a multi-viewing angle floating projection device of an embodiment according to the present disclosure which combines the features disclosed in the embodiment shown as FIG. 8A,8B and FIG. 14B. The optical elements of the multi-viewing angle floating projection device utilize a display panel 2 and an imaging concave mirror 3 to project real images V1, V2 through reflective polarizer 62 at light outlet T, wherein the display panel 2 and the imaging concave mirror 3 are shared. Please also refer to FIG. 16C showing the optical path of this embodiment. For example, when the projected real image V1 is to be formed, the first directional light beam L1 projected by the first directional light source 11 illuminates the display panel 2 and is transmitted through the first quarter-wave plate 91 to form the first directional image beam D1. The first directional image beam D1 is first reflected by the first reflector 51 and projected to the adjusting reflector 71, and then is reflected by the adjusting reflector 71; the reflected first directional image beam D1 is transmitted through the second quarter-wave plate 92 and projected to the reflective polarizer 62. Next, the first directional image beam D1 is reflected by the reflective polarizer 62 and transmitted through the second quarter-wave plate 92 to project to the imaging concave mirror 3. Then, the first directional image beam D1 is reflected by the imaging concave mirror 3 and transmitted through the second quarter-wave plate 92 and the reflective polarizer 62 at the light outlet T. The transmitted first directional image beam D1 is projected to the windshield 4 and finally forms the floating projected real image V1 reaching the first observer P1 (a driver's viewing area). The optical path of forming the projected real image V2 is similar to the optical path of the projected real image V1, and the first and second directional image beams D1, D2 have their illuminated regions completely or highly overlapped with each other on the display panel 2. The first directional image beam D1 and the second directional image beam D2 are projected from the display panel 2 toward directions separating from each other, and the optical paths thereof are changed by utilizing the first reflector 51 and the second reflector 52 such that the first directional image beam D1 and the second directional image beam D2 are converged onto the same imaging concave mirror 3.

According to the embodiments shown in FIG. 16A and FIG. 16B, the two directional image beams D1, D2 are respectively projected to the first observer P1 and the second observer P2 and form projected real images V1, V2 in midair. The time-divisionally displayed images of the display panel 2 could be the same or different. When the displayed images are the same, the two directional light beams L1, L2 could either continue to illuminate without switching time-divisionally, or switching synchronized with the time-divisional display of the display panel 2; when the displayed images are different, the switching of the two directional light beams L1, L2 is synchronized with the time-divisional display of the display panel 2; therefore, the first observer P1 and the second observer P2 can view the same or different images at the same time. The switching time is shorter than the visual persistence of human eyes, such that the observers P1, P2 will not feel interrupted at viewing the images.

Figure 16D:
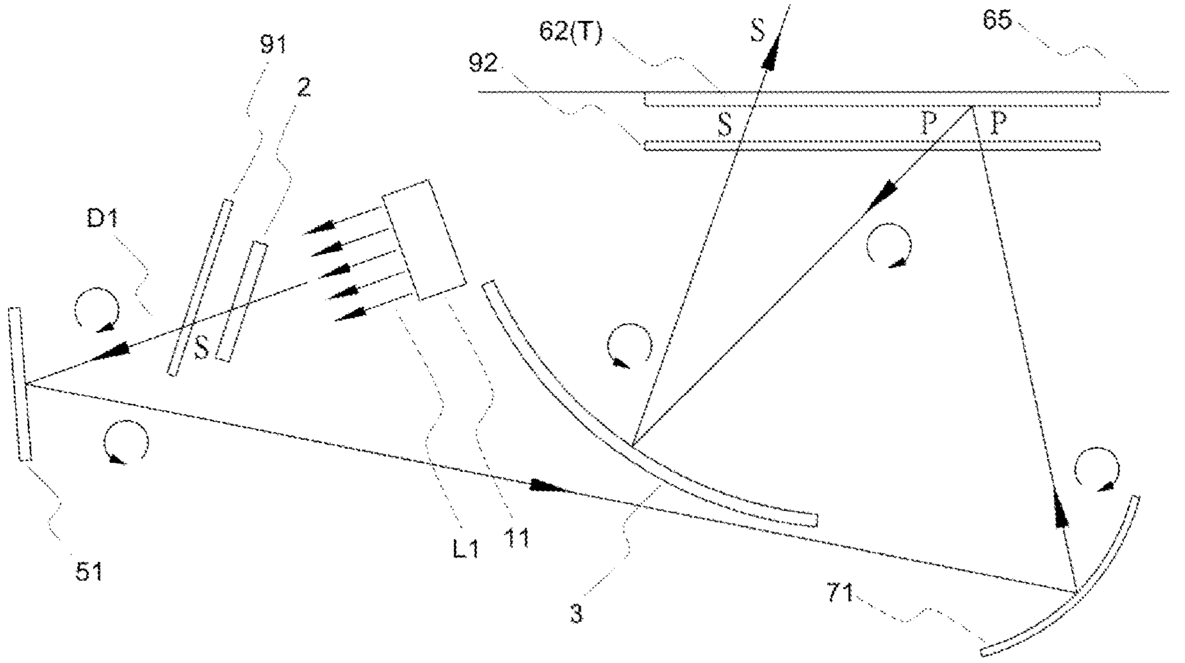

FIG. 16D is the optical path corresponding to the first observer P1 (a driver's viewing area) of FIG. 16B, showing the conversion process of polarization state of the first directional image beam D1. The polarization state shown in FIG. 16D is similar to that of FIG. 14B, wherein the difference between the current embodiment and FIG. 14B is that the S-polarized light projected by the display panel 2 is converted into right circularly polarized light after passing through the first quarter-wave plate 91 and then converted into left circularly polarized light after being reflected by the first reflector 51. The rest part of these two embodiments is the same, so they are not repeated here.

Figure 17A:
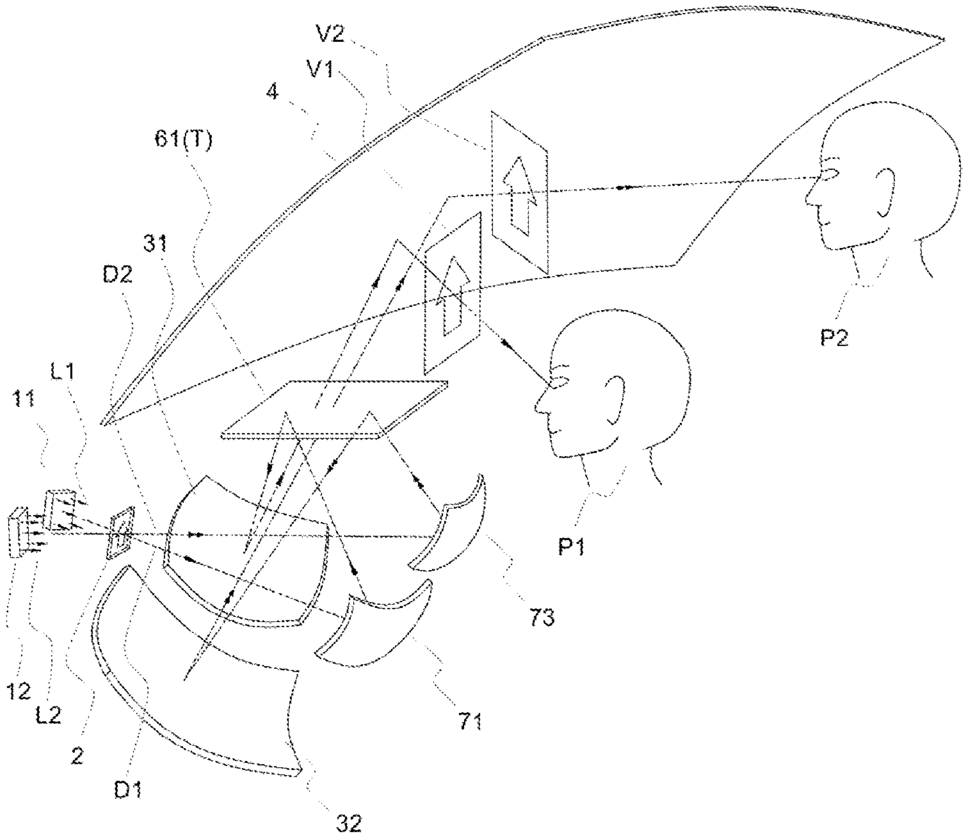
FIG. 17A is a schematic diagram of the multi-viewing angle floating projection device according to the eighth embodiment of the present disclosure.

FIG. 17A shows a multi-viewing angle floating projection device of an embodiment according to the present disclosure which combines the features disclosed in the embodiment shown as FIG. 9A,9B and FIG. 13B. The optical elements of the multi-viewing angle floating projection device utilize a display panel 2 and multiple imaging concave mirrors 31, 32 to project real images V1, V2 through a semi-reflector 61 at a light outlet T, wherein the display panel 2 is shared. For example, when the projected real image V1 is to be formed, the first directional light beam L1 projected by the first directional light source 11 illuminates the display panel 2 to form the first directional image beam D1. The first directional image beam D1 is then projected to the adjusting reflector 71, reflected by the adjusting reflector 71 and projected to the semi-reflector 61. The first directional image beam D1 is partially reflected by the semi-reflector 61 to the first imaging concave mirror 31, reflected by the first imaging concave mirror 31 and partially transmitted through the semi-reflector 61 at the light outlet T. The transmitted first directional image beam D1 is projected to the windshield 4 and forms the floating projected real image V1 reaching the first observer P1 (a driver's viewing area). The optical path of forming the projected real image V2 is similar to the optical path of the projected real image V1, and the first and second directional light beams L1, L2 have their illuminated regions completely or highly overlapped with each other on the same display panel 2.

Figure 17B:
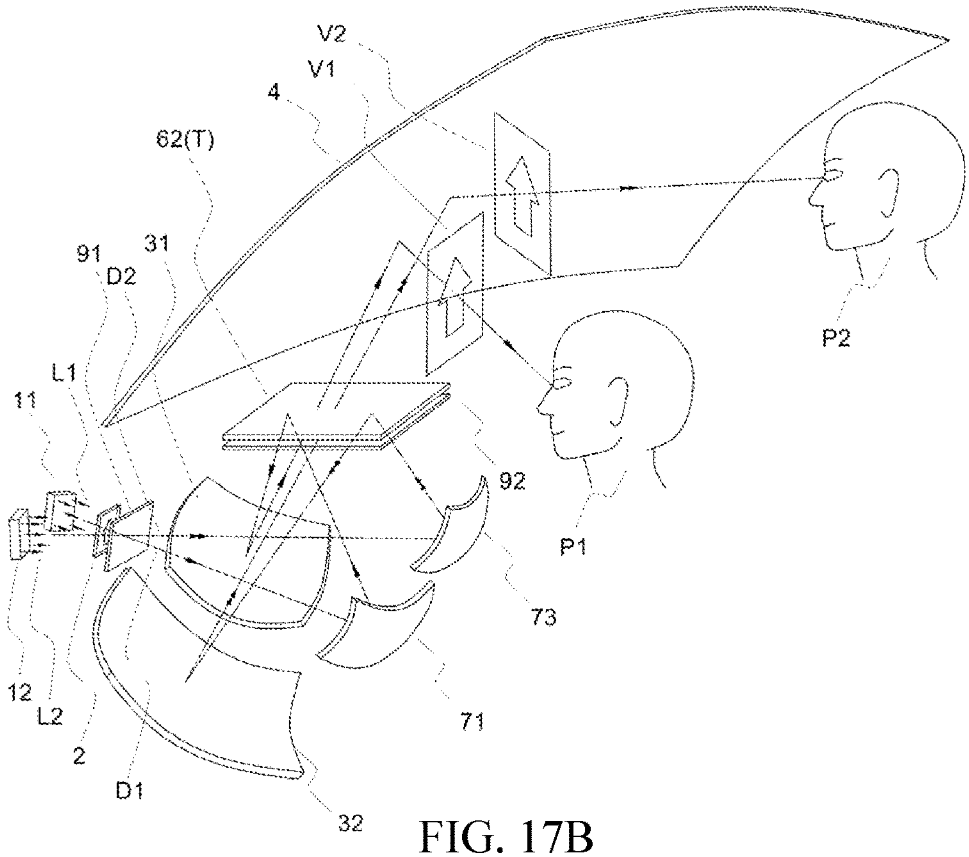
FIG. 17B is a schematic diagram of the multi-viewing angle floating projection device according to the ninth embodiment of the present disclosure.

FIG. 17B shows a multi-viewing angle floating projection device of an embodiment according to the present disclosure which combines the features disclosed in the embodiment shown as FIG. 9A,9B and FIG. 14B. The optical elements of the multi-viewing angle floating projection device utilize a display panel 2 and multiple imaging concave mirrors 31, 32 to project real images V1, V2 through a reflective polarizer 62 at a light outlet T, wherein the display panel 2 is shared. For example, when the projected real image V1 is to be formed, the first directional light beam L1 projected by the first directional light source 11 illuminates the display panel 2 and is transmitted through the first quarter-wave plate 91 to form the first directional image beam D1. The first directional image beam D1 is then projected to the adjusting reflector 71, reflected by the adjusting reflector 71 and transmitted through the second quarter-wave plate 92 to project to the reflective polarizer 62. The first directional image beam D1 is reflected by the reflective polarizer 62 and transmitted through the second quarter-wave plate 92 to project to the first imaging concave mirror 31. The first directional image beam D1 is then reflected by the first imaging concave mirror 31 and transmitted through the second quarter-wave plate 92 and the reflective polarizer 62 at the light outlet T. The transmitted first directional image beam D1 is projected to the windshield 4 and forms the floating projected real image V1 reaching the first observer P1 (a driver's viewing area). The optical path of forming the projected real image V2 is similar to the optical path of the projected real image V1, and the first and second directional light beams L1, L2 have their illuminated regions completely or highly overlapped with each other on the same display panel 2.

According to the embodiments shown in FIG. 17A and FIG. 17B, the two directional image beams D1, D2 are respectively projected to the first observer P1 and the second observer P2 and form projected real images V1, V2 in midair. The time-divisionally displayed images of the display panel 2 could be the same or different. When the displayed images are the same, the two directional light beams L1, L2 could either continue to illuminate without switching time-divisionally, or switching synchronized with the time-divisional display of the display panel 2; when the displayed images are different, the switching of the two directional light beams L1, L2 is synchronized with the time-divisional display of the display panel 2; therefore, the first observer P1 and the second observer P2 can view the same or different images at the same time. The switching time is shorter than the visual persistence of human eyes, such that the observers P1, P2 will not feel interrupted at viewing the images.

What is claimed is:

1. A multi-viewing angle floating projection device, comprising:

at least two directional light sources, each of the directional light sources adapted to emit a directional light beam respectively;

at least two display panels, the number of which is the same as the number of the at least two directional light sources, wherein each of the display panels is adapted to display an image, each of the directional light beams illuminates the image of a corresponding one of the display panels to form a directional image beam; and an imaging concave mirror, being adapted to form a real image, wherein the two directional image beams are reflected by the imaging concave mirror and projected to at least two viewing areas to form at least two floating projected real images respectively;

wherein corresponding reflected regions of the at least two directional image beams on the imaging concave mirror are the same or overlapped more than 70%;

wherein there is a viewing angle difference between viewing angles of the at least two viewing areas, each of the at least two floating projected real images is configured to project to a respective person.

2. The multi-viewing angle floating projection device of claim 1, further comprising a windshield disposed on optical paths of the at least two directional image beams being reflected by the imaging concave mirror and then projected to the at least two viewing areas.

3. The multi-viewing angle floating projection device of claim 1, further comprising a paraxial reflector disposed on optical paths of the at least two directional image beams before being projected to the imaging concave mirror.

4. The multi-viewing angle floating projection device of claim 3, wherein the paraxial reflector is a semi-reflector disposed at a light outlet.

5. The multi-viewing angle floating projection device of claim 3, wherein the paraxial reflector is a reflective polarizer disposed at a light outlet; a light-emitting side of each of the at least two display panels are provided with quarter-wave plates respectively; the reflective polarizer is also provided with another quarter-wave plate facing the imaging concave mirror.

6. The multi-viewing angle floating projection device of claim 1, further comprising at least two adjusting reflectors, which are concave mirrors or convex mirrors for adjusting a distance and a size of an image source; the number of the adjusting reflectors are the same as the number of the directional image beams and each of the adjusting reflectors is corresponding to each of the directional image beams; the at least two directional image beams projected by the at least two display panels are first reflected by the at least two adjusting reflectors respectively and then projected to the imaging concave mirror.

7. A multi-viewing angle floating projection device, comprising:

at least two directional light sources, each of the directional light sources adapted to emit a directional light beam respectively;

a display panel, being adapted to display an image; wherein each of the directional light beams illuminates the image of the display panel to form a directional image beam;

at least two reflectors, being plane mirrors; and an imaging concave mirror, being adapted to form a real image, wherein the two directional image beams are reflected by the at least two reflectors respectively and projected to the imaging concave mirror, and then are reflected by the imaging concave mirror and projected to at least two viewing areas to form at least two floating projected real images;

wherein, corresponding reflected regions of the at least two directional image beams on the imaging concave mirror are the same or overlapped more than 70%;

wherein, each of the at least two reflectors only corresponded to one of the directional image beam respectively;

wherein, there is a viewing angle difference between viewing angles of the at least two viewing areas, each of the at least two floating projected real images is configured to project to a respective person.

8. The multi-viewing angle floating projection device of claim 7, further comprising a windshield disposed on optical paths of the at least two directional image beams being reflected by the imaging concave mirror and then projected to the at least two viewing areas.

9. The multi-viewing angle floating projection device of claim 7, further comprising a paraxial reflector disposed on optical paths of the at least two directional image beams being reflected by the at least two reflectors and before being projected to the imaging concave mirror.

10. The multi-viewing angle floating projection device of claim 9, wherein the paraxial reflector is a semi-reflector disposed at a light outlet.

11. The multi-viewing angle floating projection device of claim 9, wherein the paraxial reflector is a reflective polarizer disposed at a light outlet; a light-emitting side of the display panel is provided with a quarter-wave plate; the reflective polarizer is also provided with another quarter-wave plate facing the imaging concave mirror.

12. The multi-viewing angle floating projection device of claim 7, further comprising at least two adjusting reflectors, which are concave mirrors or convex mirrors for adjusting a distance and a size of an image source; each of the adjusting reflectors is corresponding to each of the directional image beams; the at least two directional image beams projected by the display panel are first reflected by the at least two reflectors and the at least two adjusting reflectors sequentially and are then projected to the imaging concave mirror respectively.

13. The multi-viewing angle floating projection device of claim 7, wherein the display panel is adapted to display at least two images time-divisionally; the at least two images are switched corresponding to the at least two directional light beams; the at least two directional light sources are synchronized with the time-divisionally display of the at least two images on the display panels.

14. A multi-viewing angle floating projection device, comprising:

at least two directional light sources, each of the directional light sources adapted to emit a directional light beam respectively;

a display panel, being adapted to display an image; wherein each of the directional light beams illuminates the image of the display panel to form a directional image beam; and at least two imaging concave mirrors, being both adapted to form real images, wherein the number of the at least two imaging concave mirrors is the same as the number of the at least two directional light sources; the two directional image beams are reflected by the imaging concave mirrors and projected to at least two viewing areas to form at least two floating projected real images respectively;

wherein corresponding illuminated regions of the at least two directional image beams on the display panel are the same or overlapped more than 70%;

wherein, each of the at least two imaging concave mirrors only corresponded to the directional light beam from one of the at least two directional light sources;

wherein, there is a viewing angle difference between viewing angles of the at least two viewing areas, each of the at least two floating projected real images is configured to project to a respective person.

15. The multi-viewing angle floating projection device of claim 14, further comprising a windshield disposed on optical paths of the at least two directional image beams being reflected by the at least two imaging concave mirrors and projected to the at least two viewing areas.

16. The multi-viewing angle floating projection device of claim 14, further comprising a paraxial reflector disposed on optical paths of the at least two directional image beams before being projected to the at least two imaging concave mirrors.

17. The multi-viewing angle floating projection device of claim 16, wherein the paraxial reflector is a semi-reflector disposed at a light outlet.

18. The multi-viewing angle floating projection device of claim 16, wherein the paraxial reflector is a reflective polarizer disposed at a light outlet; a light-emitting side of the display panel is provided with a quarter-wave plate; the reflective polarizer is also provided with another quarter-wave plate facing the at least two imaging concave mirrors.

19. The multi-viewing angle floating projection device of claim 16, further comprising at least two adjusting reflectors, which are concave mirrors or convex mirrors for adjusting a distance and a size of an image source, wherein the number of the at least two adjusting reflectors is the same as the number of the at least two directional light sources; the at least two directional image beams projected by the display panel are first reflected by the at least two adjusting reflectors respectively and are then projected to the at least two imaging concave mirrors respectively.

20. The multi-viewing angle floating projection device of claim 16, wherein the display panel is adapted to display at least two images time-divisionally; the at least two images are switched corresponding to the at least two directional light beams; the at least two directional light sources are synchronized with the time-divisionally display of the at least two images on the display panels.

* * * * *